United States Patent Office 3,510,477
Patented May 5, 1970

3,510,477
2,2-ETHYLENE-3-OXO-STEROIDS AND INTERMEDIATES
Andrew John Manson, Beaconsfield, Quebec, Canada, assignor to Sterling Drug Inc., New York, N.Y., a corporation of Delaware
No Drawing. Continuation-in-part of application Ser. No. 502,394, Oct. 22, 1965. This application Oct. 4, 1967, Ser. No. 672,713
Claims priority, application Great Britain, Oct. 17, 1966, 46,383/66
Int. Cl. C07c *173/10, 169/22, 169/12*
U.S. Cl. 260—239.5         39 Claims

ABSTRACT OF THE DISCLOSURE 2,2-ethylene-3-oxo-steroids are prepared starting from 3-oxo-2-hydroxymethylene-steroids and proceeding successively through the intermediate 4'-hydroxyspiro[steroid-2,4'-m-dioxan]-3-ones, 2-methylene - 3-oxo-steroids, and spiro[steroid-2,3'(2'α)-1'-pyrazolin] - 3 - ones, which readily lose nitrogen to form the 2,2-ethylene-3-oxo-steroids. The latter and the novel precursors possess hormonal properties, especially progestational activity.

---

This application is a continuation-in-part of Manson application Ser. No. 502,394, filed Oct. 22, 1965 now abandoned.

This invention relates to steroids and processes for their preparation. In particular, the invention relates to a multi-step process for preparing 2,2-ethylene-3-oxo-steroids, as well as to the individual steps of said process and to products of the indivdual process steps.

The over-all process aspect of the invention can be represented as follows:

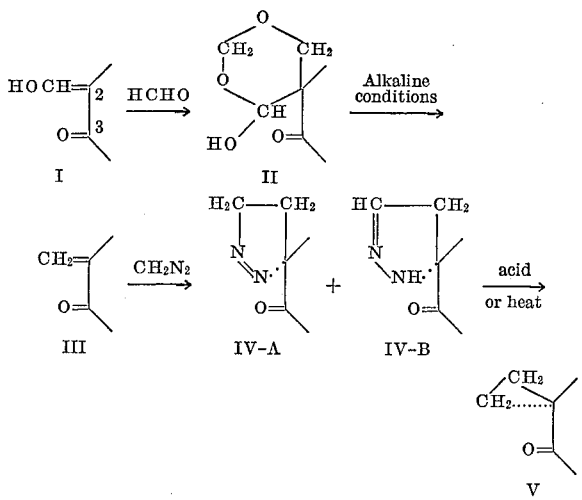

The above structures are partial formulas representing a portion of Ring A of the steroid molecule including the 2- and 3-positions.

A 2-hydroxymethylene - 3 - oxo-steroid (I) reacts with formaldehyde to form a 4'-hydroxyspiro[steroid-2,4'-m-dioxan]-3-one (II). The reaction takes place readily without heating, preferably in the presence of pyridine. The 4'-hydroxy group can readily be esterified by conventional esterification procedures to produce a 4'-acyloxyspiro-[steroid-2,4'-m-dioxan]-3-one wherein the acyl group is a carboxylic acyl group having from one to about twelve carbon atoms.

When the 4'-hydroxyspiro[steroid-2,4'-m-dioxan]-3-one or ester thereof is subjected to mild alkaline conditions the dioxane ring is cleaved to produce a 2-methylene-3-oxo-steroid (III). The mild alkaline conditions are produced by contacting the steroid with a weak inorganic base, for example, an alkali metal carbonate or aluminum oxide.

The 2-methylene-3-oxo-steroid reacts with diazomethane to give a spiro[steroid-2,3'(2'α)-1'-pyrazolin]-3-one (IV-A). The latter may in part rearrange to the isomeric spiro[steroid-2,3'(2'α) - 5' - pyrazolin] - 3 - one (IV-B) under the reaction conditions and work-up procedures used. The pyrazolines (IV-A and IV-B) in acid medium, or by simple pyrolysis, lose nitrogen and are converted to a 2,2-ethylene-3-oxo-steroid (V). The nature of the acid in the acid medium is not critical and can be any conventional inorganic or organic acid as well as an acid of the Lewis type such as boron trifluoride.

All of the above reactions in the sequence I–V take place in an inert solvent at room temperature. Reactive oxo groups in the steroid molecule can be protected by ketalization and the free oxo compounds regenerated by treating the ketals with acid.

The starting materials, the 2-hydroxymethylene-3-oxo-steroids (I) are a known class of compounds readily prepared by reacting the appropriate 3-oxo-steroid with ethyl formate in the presence of a strong base such as sodium methoxide or sodium hydride under anhydrous conditions.

The exact nature of the remainder of steroid moiety is not critical, and it can be derived from any steroid of the general type known to have hormonal or other pharmacological or endocrinological properties. Such steroid moieties have from seventeen to about twenty-three carbon atoms, not counting carbon content which may be provided by esterified hydroxy groups. Esterified hydroxysteroids are included within the scope of the invention, but the carbon content contributed by the acid moiety of the ester is not considered part of the essential carbon content of the steroid.

The steroid moiety can be any member of the estrane, 18-norestrane, androstane, etiocholane (5β-androstane), pregnane or allopregnane series. The foregoing can contain varying degrees of unsaturation and a variety of substituents in the form of hydrocarbon radicals or functional groups conventionally employed in the steroid art. Representative of the steroid moieties which make up the compounds of the invention are those having at position 17 a hydroxy, acyloxy, oxo, or both a hydroxy and a lower-alkyl radical, characteristic of the androgenic and anabolic steroids; or a lower-alkenyl, lower-alkynyl, acetyl, hydroxyacetyl, 1,2-dihydroxyethyl, 1-hydroxyethyl, and the like radicals, characteristic of the progestational and adrenal cortical steroids. The steroid moiety can also have one or more substituents at other positions of the nucleus, for example, hydroxy, acyloxy, or oxo radicals at positions 6, 7, 11, 12 or 16; halogen atoms, preferably fluorine, chlorine or bromine, for example, at the 4-, 6-, 7-, 9-, 12-, 16-, 17- or 21-positions; and lower-alkyl groups, for example, at the 4-, 5-, 6-, 7-, 11- or 16-positions. The steroid moiety can also have one or more double bonds, for example, at the 4,5-, 6,7-, 9,11-, 15,16-, 16,17- or 17,20-positions. The steroid moiety usually possesses angular methyl groups at $C_{10}$ and $C_{13}$, although 18- and 19-norsteroids and 18,19-bisnorsteroids, lacking one or both of the angular methyl groups at $C_{13}$ and $C_{10}$, respectively, are also representative steroids.

The 18,19-bisnorsteroid, 18,19-norsteroid and normal steroid moieties in the compounds of the invention contain, respectively, seventeen, eighteen and nineteen carbon atoms plus any carbon content which may be provided by one or more nuclearly substituted carbon containing radicals, up to and including a total of about twenty-three carbon atoms, exclusive of ester radicals.

When acyloxy radicals are present in the steroid moiety, the acyl radicals are preferably derived from carboxylic acids having from one to about twelve carbon atoms, conventionally employed in the steroid art, and having a molecular weight less than about 250. Representative of the acyl radicals which can be present are lower-alkanoyl radicals, e.g., formyl acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; benzoyl; phenyl-lower-alkanoyl or -alkenoyl radicals, such as phenylacetyl, β-phenylpropionyl, cinnamoyl, and the like; and phenoxy-lower-alkanoyl radicals, such as phenoxyacetyl, and the like. In the acyl radicals containing phenyl, the benzene ring of the phenyl can, if desired, bear any number and kind of substituents as will be obvious to the chemist skilled in this art, and including, but not limited to, lower-alkyl (e.g., methyl), lower-alkoxy (e.g., ethoxy), lower-alkylthio (e.g., ethylthio), halogen (including fluorine, chlorine, bromine and iodine), nitro, and trifluoromethyl.

A product aspect of the invention resides in the 4'-hydroxyspiro[steroid-2,5'-m-dioxan]-3-ones of Formula II. An especially preferred group of compounds, derived from readily available starting materials, comprises those having the formula

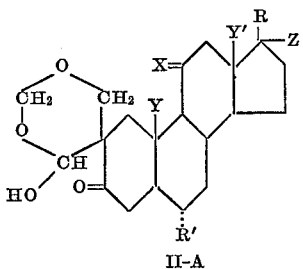

II-A wherein R is hydrogen, lower-alkyl, lower-alkenyl, lower-alkynyl, acetyl, hydroxyacetyl, 1,2-dihydroxyethyl or 1-hydroxyethyl; R' is hydrogen or methyl; X is $H_2$, (H)(OH) or O; Y and Y' are hydrogen or methyl; and Z is hydrogen or hydroxy, Z being restricted to hydroxy when R is hydrogen, lower-alkyl, lower-alkenyl or lower-alkynyl. Also included are compounds of the above Formula II-A having a double bond in the 4,5-position, or two double bonds in the 4,5- and 6,7-positions, and carboxylic acid esters, including 3-enol esters, of the foregoing in which the acyl group has from one to twelve carbon atoms of the type described hereinabove. In the compounds where R is acetyl or hydroxyacetyl the 20-oxo group can be protected in the form of a ketal which is readily cleaved to the free 20-oxo compound with dilute acid. The ketals are within the purview of the invention, and the 20-oxo compounds and the ketals thereof are considered substantial equivalents. The 3-oxo group can be protected in the form of a lower-alkyl enol ether which is readily cleaved to the free 3-oxo compound with dilute acid. The 3-enol ethers are also within the purview of the invention, and the 3-oxo compounds and the enol ethers thereof are considered substantial equivalents.

In the above general Formula II-A, R, when it represents a lower-alkyl, lower-alkenyl or lower-alkynyl radical, has from one to about four carbon atoms and may be straight or branched and thus includes such groups as methyl, ethyl, propyl, isopropyl, butyl, isobutyl, tertiary-butyl, vinyl, 1-propenyl, 2-propenyl, ethynyl, propargyl, 1-butynyl and the like.

A further product aspect of the invention resides in 2-methylene steroids of the formula

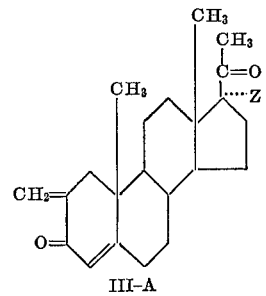

III-A wherein Z is hydrogen or hydroxy. The 20-oxo group can be protected in the form of a ketal which is readily cleaved to the free 20-oxo compound with dilute acid. The ketals are within the purview of the invention and the 20-oxo compounds and the ketals thereof are considered substantial equivalents.

A further product aspect of the invention resides in the spiro[steroid-2,3'(2₂α)-1'-pyrazolin]-3-one of Formula IV-A and the spiro[steroid-2,3'(2'α)-5'-pyrazolin]-3-ones of Formula IV-B. An especially preferred group of compounds, derived from readily available starting materials, comprises those having the formula

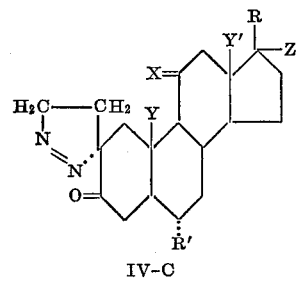

IV-C or

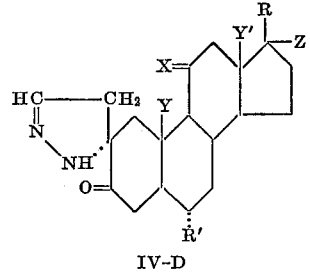

IV-D wherein R is hydrogen, lower-alkyl, lower-alkenyl, lower-alkynyl, acetyl, hydroxyacetyl, 1,2-dihydroxyethyl or 1-hydroxyethyl; R' is hydrogen or methyl; X is $H_2$ (H)(OH) or O; Y and Y' are hydrogen or methyl; and Z is hydrogen or hydroxy, Z being restricted to hydroxy when R is hydrogen, lower-alkyl, lower-alkenyl or lower-alkynyl. Also included are compounds of the above Formulas IV-C and IV-D having a double bond in the 4,5-position, or two double bonds in the 4,5- and 6,7-positions, and carboxylic acid esters, including 3-enol esters, of the foregoing in which the acyl group has from one to twelve carbon atoms. In the compounds where R is acetyl or hydroxyacetyl the 20-oxo group can be protected in the form of a ketal which is readily cleaved to the free 20-oxo compound with dilute acid. The ketals are within the purview of the invention, and the 20-oxo compounds and the ketals thereof are considered substantial equivalents. The 3-oxo group can be protected in the form of a lower-alkyl enol ether which is readily cleaved to the free 3-oxo compound with dilute acid. The 3-enol ethers are also within the purview of the invention, and the 3-oxo compounds and the enol ethers thereof are considered substantial equivalents.

The pyrazolines of Formulas IV-A and IV-B are weak bases and form acid-addition salts when treated with strong acids. The free base and acid-addition salt forms are both within the purview of the invention and are the substantial equivalents of one another.

A further product aspect of the invention resides in certain 2,2-ethylene-3-oxo-steroids of Formula V, in particular those having the formula

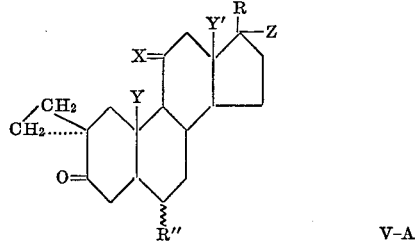

V-A wherein R is lower-alkenyl, lower-alkynyl, acetyl, hydroxyacetyl, 1,2-dihydroxyethyl or 1-hydroxyethyl; R'' is hydrogen or α-methyl; X is $H_2$, (H)(OH) or O; Y and Y' are hydrogen or methyl; and Z is hydrogen or hydroxy, Z being restricted to hydroxy when R is lower-alkenyl or lower-alkynyl. Also included are compounds of the above Formula V–A, wherein R, X, Y, Y' and Z have the meanings given above and R'' is hydrogen, α-methyl or halo, having a double bond in the 4,5-position, or two double bonds in the 4,5-and 6,7-positions; and carboxylic acid esters, including 3-enol esters, of the foregoing in which the acyl group has from one to twelve carbon atoms. In the compounds where R is acetyl or hydroxyacetyl, the 20-oxo group can be protected in the form of a ketal which is readily cleaved to the free 20-oxo compound with dilute acid. The ketals are within the purview of the invention, and the 20-oxo compounds and the ketals are considered substantial equivalents. The 3-oxo group can be protected in the form of a lower-alkyl enol ether which is readily cleaved to the free 3-oxo compound with dilute acid. The 3-enol ethers are also within the purview of the invention, and the 3-oxo compounds and the enol ethers thereof are considered substantial equivalents.

In the unsaturated compounds of Formula V-A where R'' is halo, the halogen can be any halogen, preferably fluorine, chlorine or bromine, and such compounds are prepared by known halogenation procedures starting from the compounds where R'' is hydrogen.

The structures of the products of the invention were established by the modes of synthesis, by elementary analysis, and by ultraviolet, infrared and nuclear magnetic resonance spectra. The course of the reactions and homogeneity of the products were determined by thin layer chromatography.

Biological evaluation of the compounds of the invention, including compounds of Formulas II (II–A), III, IV–A (IV–C), IV–B (IV–D) and V (V–A), has indicated that they possess useful hormonal properties, including progestational, myotrophic and growth promoting properties. The actual determination of the numerical biological activity definitive for a particular compound is readily determined by standard test procedures by technicians having ordinary skill in pharmacological test procedures, without the need for any extensive experimentation.

The primary usefulness of the compounds of Formulas II, III and IV is as intermediates in the preparation of the compounds of Formula V.

The compounds of Formula V are of especial interest because of their progestational activity, as measured by endometrial response when administered intramuscularly or orally to estrogen-primed immature female rabbits.

The compounds of the invention are effective in amounts of 0.5–50 mg. per dosage unit depending upon the compound used, the manner of administration and the condition to be treated. They are prepared for use by conventional pharmaceutical procedures used to formulate other steroid hormones; that is, in capsule or tablet form with conventional excipients (for example, calcium carbonate, starch, lactose, talc, magnesium stearate, gum acacia, and the like) for oral administration, or as an aqueous or oil suspension in a pharmaceutically acceptable vehicle (aqueous alcohol, glycol, oil solution, or oil-water emulsion) for parenteral administration.

The following examples will further illustrate the invention without the latter being limited thereby.

(A) SPIRO-DIOXANES

Example A1

(a) 4'-hydroxyspiro[4-pregnene - 2,5' - m - dioxane]-3,20-dione 20-monoethylene glycol ketal.—To a solution of 5.9 g. of 2-hydroxymethylene-4-pregnene-3,20-dione 20-monoethylene glycol ketal in 80 ml. of pyridine was added 14.0 ml. of 40% aqueous formaldehyde. The reaction mixture was allowed to stand for twenty hours at room temperature and then poured into 600 ml. of water. The solid precipitate which had formed was collected by filtration, washed with water and dried to give 7.24 g., M.P. 129–134° C. The latter was recrystallized successively from acetone, methylene dichloride, acetone and ethyl acetate to give 4'-hydroxyspiro[4-pregnene - 2,5' - m-dioxane]-3,20-dione 20-monoethylene glycol ketal in the form of colorless prisms, M.P. 153.6–157.2° C. (corr.), $[\alpha]_D^{25} = +33.4°$ (1% in chloroform); ultraviolet maximum at 248 mμ ($\epsilon$=12,000); infrared absorption at 2.90, 3.36, 3.43, 3.48 and 3.53μ.

(b) 4'-hydroxyspiro[4-pregnene - 2,5' - m - dioxane]-3,20-dione [II–A ($\Delta^4$); R is β-COCH$_3$, R' is H, X is H$_2$, Y and Y' are CH$_3$, Z is H].—A solution of 12.8 g. of 4'-hydroxyspiro[4-pregnene-2,5'-m-dioxane]-3,20-dione 20-monoethylene glycol ketal in 450 ml. of 80% aqueous acetic acid was allowed to stand at room temperature for about sixteen hours. The mixture was poured into water, the product collected by filtration and recrystallized from acetone to give 4'-hydroxyspiro[4-pregnene - 2,5' - m-dioxane]-3,20-dione in the form of colorless needles, M.P. 208.0–209.0° C. (corr.), $[\alpha]_D^{25} = +134.6°$ (0.5% in chloroform); ultraviolet maxima at 246 and 306 mμ ($\epsilon$=13,800 and 1400); infrared absorption at 2.86, 3.41, 3.49, 5.85, 6.06, 6.76 and 6.89μ.

Example A2

(a) 4',17β-dihydroxyspiro[4-androstene - 2,5' - m-dioxan]-3-one [II–A ($\Delta^4$); R and R' are H, X is H$_2$, Y and Y' are CH$_3$, Z is β-OH] was prepared from 50.0 g. of 2-hydroxymethylene-4-androsten-17β-ol-3-one and 60 ml. of 40% formaldehyde in 100 ml. of pyridine according to the procedure described above in Example A1, part (a). The product was recrystallized from acetone and obtained in the form of a colorless powder, M.P. 146.5–150.0° C. (dec.) (corr.), $[\alpha]_D^{25} = +37.4°$ (1% in chloroform); ultraviolet maxima at 247 and 315 mμ ($\epsilon$=14,000 and 270); infrared absorption at 2.94, 3.09, 3.44, 3.50–55, 6.05, 6.80 and 6.90μ.

4',17β-dihydroxyspiro[4-androstane-2,5' - m - dioxan]-3-one showed a myotrophic response with moderate degree of separation of myotrophic and androgenic activities when administered subcutaneously to castrated immature male rats at a dose level of 10 mg./kg./day.

4',17β-dihydroxyspiro[4-androstene-2,5' - m - dioxan]-3-one showed progestational activity by positive endometrial response when administered intramuscularly to estrogen-primed immature female rabbits at a dose level of 10 mg./kg./day.

4',17β-dihydroxyspiro[4-androstene-2,5' - m - dioxan]-3-one caused promotion of growth when administered subcutaneously to mature female rats at a dose level of 10 mg./kg./day.

(b) 4',17β - diacetoxyspiro[4 - androstene - 2,5' - m-dioxan]-3-one.—A mixture of 6.00 g. of 4',17β-dihydroxyspiro[4-androstene-2,5'-m-dioxan]-3-one, 4.00 ml. of acetic anhydride and 40 ml. of pyridine was stirred for two hours at room temperature and allowed to stand overnight. The reaction mixture was diluted with water and extracted with ether. The ether was washed with water, dried over anhydrous sodium sulfate and concentrated to remove the solvent. The residue was recrystalized three times from acetone to give 4′,17β-diacetoxyspiro[4-androstene-2,5′-m-dioxan]-3-one in the form of colorless needels, M.P. 233.0–234.0° C., $[\alpha]_D^{25}=+60.4°$ (1% in chloroform); ultraviolet maximum at 247 m$\mu$ ($\epsilon$=15,400); infrared absorption at 2.90, 3.42, 5.66, 5.76, 6.02, 6.75, 6.88, 6.94, 8.00 and 8.16$\mu$.

4′,17β-diacetoxyspiro[4-androstene-2,5′ - m - dioxan]-3-one caused promotion of growth when administered subcutaneously to mature female rats at a dose level of 10 mg./kg./day.

By replacing the acetic anhydride in the foregoing preparation by a molar equivalent of propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride or cinnamoyl chloride there can be obtained, respectively, 4′,17β-dipropionoxyspiro[4-androstene-2,5′-m-dioxan]-3-one,
4′,17β-dicaproyloxyspiro[4-androstene-2,5′-m-dioxan]-3-one,
4′,17β-di(β-carboxypropionoxy)spiro[4-androstene-2,5′-m-dioxan]-3-one,
4′,17β-di(β-cyclopentylpropionoxy)spiro[4-androstene-2,5′-m-dioxan]-3-one,
4′,17β-dibenzoyloxyspiro[4-androstene-2,5′-m-dioxan]-3-one,
4′,17β-di(p-nitrobenzoyloxy)spiro[4-androstene-2,5′-m-3-one,
4′,17β-di(3,4,5-trimethoxybenzoyloxy)spiro[4-androstene-2,5′-m-dioxan]-3-one,
4′,17β-di(phenylacetoxy)spiro[4-androstene-2,5′-m-dioxan]-3-one, or
4′,17β-dicinnamoyloxyspiro[4-androstene-2,5′-m-dioxan]-3-one.

Example A3

(a) 4′,17β-dihydroxy-17α-methylspiro[4 - androstene-2,5′-m-dioxan]-3-one [II–A ($\Delta^4$); R is $\alpha$=CH$_3$, R′ is H, X is H$_2$, Y and Y′ are CH$_3$, Z is β—OH] was prepared from 25.0 g. of 2-hydroxymethylene-17α-methyl-4-androsten-17β-ol-3-one and 25 ml. of 40% formaldehyde in 100 ml. of pyridine according to the procedure described above in Example A1, part (a). The product was recrystallized first from a methylene dichloride-ether mixture and then from acetone to give 4′,17β-dihydroxy-17α-methylspiro[4-androstene-2,5′-m - dioxan] - 3 - one, M.P. 142.0–143.0° C. (dec.) (corr.); $[\alpha]_D^{25}=+12.9°$ (1% in chloroform); ultraviolet maximum at 247 m$\mu$ ($\epsilon$=13,400); infrared absorption at 3.06, 3.42, 3.51, 3.61, 5.84, 6.09, 6.19, 6.29, 6.72, 6.84 and 6.94$\mu$.

4′,17β-dihydroxy-17α-methylspiro[4-androstene - 2,5′-m-dioxan]-3-one showed progestational activity by positive endometrial response when administered intramuscularly to estrogen-primed immature female rabbits at a dose level of 10 mg./kg./day.

4′,17β-dihydroxy-17α-methylspiro[4-androstene - 2,5′-m-dioxan]-3-one caused promotion of growth when administered subcutaneously to mature female rats at a dose level of 10 mg./kg./day.

(b) 4′-acetoxy-17β-hydroxy-17α - methylspiro[4 - androstene-2,5′-m-dioxan]-3-one was prepared from 4.00 g. of 4′,17β-dihydroxy-17α-methylspiro[4-androstene - 2,5-m-dioxan]-3-one and 5.00 ml. of acetic anhydride in 400 ml. of pyridine according to the procedure described above in Example A2, part (b). The product was recrystallized from acetone and ethyl acetate and was obtained in the form of colorless rods, M.P. 232.0–235.0° C. (corr.); $[\alpha]_D^{25}=+42.9°$ (1% in chloroform); ultraviolet maximum at 248 m$\mu$ ($\epsilon$=14,200); infrared absorption at 2.84, 2.90, 3.43, 3.50, 5.70, 6.10, 6.19, 6.70, 6.80 and 6.90$\mu$.

4′-acetoxy-17β-hydroxy - 17α - methylspiro[4 - androstene-2,5′-m-dioxan]-3-one showed a myotrophic response with high degree of separation of myotrophic and androgenic activities when administered subcutaneously to catstrated immature male rats at a dose level of 10 mg./kg./day.

4′-acetoxy-17β-hydroxy - 17α - methylspiro[4 - androstene-2,5′-m-dioxan]-3-one caused promotion of growth when administered subcutaneously to mature female rats at a dose level of 10 mg./kg./day.

Example A4

(a) 4′,17β-dihydroxy-17α-ethynylspiro[4 - androstene-2,5′-m-dioxan]-3-one [II–A ($\Delta^4$); R is $\alpha$=C≡CH, R′ is H, X is H$_2$,Y and Y′ are CH$_3$, Z is β=OH] was prepared from 50.0 g. of 2-hydroxymethylene-17α-ethynyl-4-androsten-17β-ol-3-one and 50.0 ml. of 40% formaldehyde in 200 ml. of pyridine according to the procedure described above in Example A1, part (a). The product was recrystallized several times from acetone and obtained in the form of colorless needles, M.P. 146.0–150.0° C. (dec.) (corr.); $[\alpha]_D^{25}=-10.9°$ (1% in pyridine); ultraviolet maximum at 248 m$\mu$ ($\epsilon$=13,800); infrared absorption at 2.95, 3.05, 3.43, 3.51, 3.63, 5.85, 6.09, 6.18, 6.28 and 6.76$\mu$.

(b) 4′-acetoxy-17β-hydroxy-17α - ethynylspiro]4 - androstene-2,5′-m-dioxan]-3-one was prepared from 7.5 g. of 4′,17β-dihydroxy-17α-ethynylspiro[4-androstene - 2,5′-m-dioxan]-3-one and 10.0 ml. of acetic anhydride in 50 ml. of pyridine according to the procedure described above in Example A2, part (b). The product was recrystallized successively from acetone, acetone-pentane and ethyl acetate and obtained in the form of colorless crystals, M.P. 226.0–229.0° C. (corr.); $[\alpha]_D^{25}=0°$ (1% in chloroform); ultraviolet maximum at 247 m$\mu$ ($\epsilon$=10,900); infrared absorption at 2.87, 3.11, 3.43, 3.52, 4.77, 5.65, 5.70, 6.01, 6.06, 6.19 and 6.91$\mu$.

Example A5

4′,17β - diacetoxyspiro[19 - nor - 4 - androstene - 2,5′-m-dioxan]-3-one [II–A ($\Delta^4$); R is β-OH, R′ is H, X is H$_2$, Y is H, Y′ is CH$_3$, Z is H, diacetate].—A mixture of 10.0 g. of 2-hydroxymethylene-19-nor-4-androsten-17β-ol-3-one and 15 ml. of 40% aqueous formaldehyde in 100 ml. of pyridine was stirred at room temperature for one and one-half hours. The reaction mixture was added to 500 ml. of water and extracted with chloroform. The chloroform extracts were concentrated until a pyridine solution of the product remained. Acetic anhydride (10 ml.) was then added and the mixture kept at 0° C. for about sixteen hours. The reaction mixture was added to water, the product collected by filtration and recrystallized from acetone and methanol to give 4′,17β-diacetoxyspiro[19 - nor-4-androstene-2,5′-m-dioxan]-3-one, M.P. 226.0–234.0° C. (corr.); $[\alpha]_D^{25}=+48.8°$ (1% in chloroform); ultraviolet maximum at 244 m$\mu$ ($\epsilon$=16,300); infrared absorption at 3.45, 3.52, 5.66, 5.80, 6.02, 6.19 and 8.26$\mu$.

Example A6

4′,17α - dihydroxyspiro[4 - pregnene - 2,5′ - m - dioxane]-3,20-dione 20-monoethylene glycol ketal [II–A ($\Delta^4$); R is COCH$_3$ (ketal), R′ is H, X is H$_2$, Y and Y′ are CH$_3$, Z is α-OH] was prepared from 20.0 g. of 2-hydroxymethylene - 4 - pregnene - 17α - ol - 3,20 - dione 20-monoethylene glycol ketal and 30.0 ml. of 40% formaldehyde in 300 ml. of pyridine according to the procedure described above in Example A1, part (a). The product obtained had the M.P. 204–211° C. (uncorr.) and was used directly without further purification in Example B6 below.

Example A7

4′,17β - dihydroxy - 17α - ethynylspiro[19 - nor - 4 - androstene - 2,5′ - m - dioxan] - 3 - one [II–A ($\Delta^4$); R is α-C≡CH, R' is H, X is H$_2$, Y is H, Y' is CH$_3$, Z is β-OH] was prepared from 27.0 g. of 2-hydroxymethylene-17α-ethynyl - 19 - nor - 4 - androsten - 17β - ol - 3 - one and 20 ml. of 40% formaldehyde in 150 ml. of pyridine according to the procedure described above in Example A5. The crude product was not purified but was used directly in Example B7 below.

According to the foregoing procedures the following compounds can be prepared:

| Ex. | Starting material | Final product |
|---|---|---|
| A8 | 2-hydroxymethylene-17α-ethyl-4-androsten-17β-ol-3-one. | 4',17β-dihydroxy-17α-ethylspiro[4-androstene-2,5'-m-dioxan]-3-one. |
| A9 | 2-hydroxymethylene-17α-vinyl-4-androsten-17β-ol-3-one. | 4',17β-dihydroxy-17α-vinylspiro[4-androstene-2,5'-m-dioxan]-3-one. |
| A10 | 2-hydroxymethylene-17α-methyl-5α-androstan-17β-ol-3-one. | 4',17β-dihydroxy-17α-methylspiro[5α-androstane-2,5'-m-dioxan]-3-one. |
| A11 | 2-hydroxymethylene-17α-methyl-5β-androstan-17β-ol-3-one. | 4',17β-dihydroxy-17α-methylspiro[5β-androstane-2,5'-m-dioxan]-3-one. |
| A12 | 2-hydroxymethylene-17α-methyl-19-norandrostan-17β-ol-3-one. | 4',17β-dihydroxy-17α-methylspiro[19-nor-5α-androstane-2,5'-m-dioxan]-3-one. |
| A13 | 17α-ethyl-2-hydroxy-methylene-5α-androstan-17β-ol-3-one. | 4',17β-dihydroxy-17α-ethylspiro[5α-androstane-2,5'-m-dioxan]-3-one. |
| A14 | 2-hydroxymethyleneallopregnane-3,20-dione 20-ethylene glycol ketal. | 4'-hydroxyspiro[allo-pregnane-2,5'-m-dioxane]-3,20-dione 20-ethylene glycol ketal. |
| A15 | 2-hydroxymethylene-pregnane-3,20-dione. | 4'-hydroxyspiro[pregnane-2,5'-m-dioxane]-3,20-dione. |
| A16 | 2-hydroxymethylene-5α-androstan-17β-ol-3-one. | 4',17β-dihydroxyspiro[5α-androstane-2,5'-m-dioxan]-3-one. |
| A17 | 2-hydroxymethylene-4,6-androstadien-17β-ol-3-one. | 4'-hydroxyspiro[4,6-androstadiene-2,5'-m-dioxan]-3-one. |
| A18 | 2-hydroxymethylene-4-pregnen-20β-ol-3-one. | 4',20β-dihydroxyspiro[4-pregnene-2,5'-m-dioxan]-3-one. |
| A19 | 2-hydroxyethylene-4,4,17α-trimethyl-5-androsten-17β-ol-3-one. | 4',17β-dihydroxy-4,4,17α-trimethylspiro']5-androstene-2,5'-m-dioxan]-3-one. |
| A20 | 2-hydroxymethylene-4,4-dimethyl-5-androsten-17β-ol-3-one. | 4',17β-dihydroxy-4,4-dimethylspiro[5-androstene-2,5'-m-dioxan]-3-one. |
| A21 | 2-hydroxymethylene-4-pregnene-17α,21-diol-3,11,20-trione. | 4',17α,21-trihydroxyspiro[4-pregnene-2,5'-m-dioxane]-3,11,20-trione. |
| A22 | 2-hydroxymethylene-17α-ethynyl-5α-androstan-17β-ol-3-one. | 4',17β-dihydroxy-17α-ethynylspiro[5α-androstane-2,5'-m-dioxan]-3-one. |
| A23 | 2-hydroxymethylene17α-propargyl-5α-androstan-17β-ol-3-one. | 4',17β-dihydroxy-17α-propargylspiro[5α-androstane-2,5'-m-dioxan]-3-one. |
| A24 | 2-hydroxymethylene-4-pregnene-20,21-diol-3-one. | 4',20,21-trihydroxyspiro-[4-pregnene-2,5'-m-dioxan]-3-one. |
| A25 | 2-hydroxymethylene-9-fluoro-4-pregnene-11β,17α,21-triol-3,20-dione 20-monoethylene glycol ketal. | 4',11β,17α-tetrahydroxy-9α-fluorospiro-[4-pregnene-2,5'-m-dioxane]-3,20-dione 20-monoethylene glycol ketal. |
| A26 | 2-hydroxymethylene-4-pregnene-16α,17α,21-triol-3,20-dione-9β,11β-oxide 20-monoethylene glycol ketal. | 4',16α,17α,21-tetrahydroxy-9β,11β-epoxyspiro[4-pregnene-2,5'-m-dioxane]-3,20-dione 20-monoethylene glycol ketal. |
| A27 | 2-hydroxymethylene-17α-propynyl-6α-methyl-4-androsten-17β-ol-3-one. | 4',17β-dihydroxy-17α-(1-propynyl)-6α-methylspiro-[4-androstene-2,5'-m-dioxan]-3-one. |
| A28 | 2-hydroxymethylene-21-acetoxy-4-pregnene-11β,17α-diol-3,20-dione 20-monoethylene glycol ketal. | 4',11β.17α-trihydroxy-21-acetoxyspiro[4-pregnene-2,5'-m-dioxane]-3,20-dione 20-monoethylene glycol ketal. |
| A29 | 2-hydroxymethylene-21-acetoxy-4-pregnen-17α-ol-3,20-dione 20-mono-ethylene glycol ketal. | 4',17α-dihydroxy-21-acetoxyspiro[4-pregnene-2,5'-m-dioxane]-3,20-dione 20-monoethylene glycol ketal. |
| A30 | 2-hydroxymethylene-21-acetoxy-4-pregnene-11β,16α,17α-triol-3,20-dione 20-monoethylene glycol ketal. | 4',11β,16α-tetrahydroxy-21-acetoxyspiro-[4-pregnene-2,5'-m-dioxane]-3,20-dione 20-monoethylene glycol ketal. |
| A31 | 2-hydroxymethylene-4,17(20)-pregnadiene-11β,21-diol-3-one. | 4',11β,21-trihydroxyspiro-[4,17(20)-pregnadiene-2,5'-m-dioxan]-3-one. |
| A32 | 2-hydroxymethylene-5α-androstane-6β,17β-diol-3-one. | 4',6β,17β-trihydroxyspiro-[5α-androstane-2,5'-m-dioxan]-3-one. |
| A33 | 2-hydroxymethylene-17α-ethynyl-4-androstene-17β-ol-3,11-dione. | 4',17β-dihydroxy-17α-ethynlspiro[4-androstene-2,5'-m-dioxane]-3,11-dione. |
| A34 | 2-hydroxymethylene-17α-methyl-4-androsten-17β-ol-3,11-dione. | 4',17β-dihydroxy-17α-methyl-spiro[4-androstene-2,5'-m-dioxane]-3,11-dione. |
| A35 | 2-hydroxymethylene-4-androstene-17β-ol-3,11-dione. | 4',17β-dihydroxyspiro[4-androstene-2,5'-m-dioxane]-3,11-dione. |
| A36 | 2-hydroxymethylene-17α-methyl-4-androstene-6β,,17β-diol-3-one. | 4',6β,17β-trihydroxy-17α-methylspiro[4-androstene-2,5'-m-dioxan]-3-one. |
| A37 | 2-hydroxymethylene-4-androstene-14α,17β-diol-3-one. | 4',14α,17β-trihydroxy-spiro[4-androstene-2,5'-m-dioxan]-3-one. |
| A38 | 2-hydroxymethylene-16β-methyl-4-androsten-17β-ol-3-one. | 4',17β-dihydroxy-16β-methylspiro[4-androstene-2,5'-m-dioxan]-3-one. |
| A39 | 2-hydroxymethylene-4-androstene-11α,17β-diol-3-one. | 4',11α,17β-trihydroxyspiro [4-androstene-2,5'-m-dioxan]-3-one. |
| A40 | 2-hydroxymethylene-4-bromo-17α-methyl-4-androsten-17β-ol-3-one. | 4',17β-dihydroxy-4-bromo-17α-methylspiro[4-androstene-2,5'-m-dioxan]-3-one. |
| A41 | 2-hydroxymethylene-4-methyl-4-androsten-17β-ol-3-one. | 4',17β-dihydroxy-4-methylspiro[4-androstene-2,5'-m-dioxan]-3-one. |
| A42 | 2-hydroxymethylene-21-acetoxy-4-pregnene-12α,17α-diol-3,20-dione 20-monoethylene glycol ketal. | 4',12α,17α-trihydroxy-21-acetoxyspiro[4-pregnene-2,5'-m-dioxane]-3,20-dione 20-monoethylene glycol ketal. |
| A43 | 2-hydroxymethylene-4,11-pregnadiene-3,20-dione 20-monoethylene glycol ketal. | 4'-hydroxyspiro[4,11-pregnadiene-2,5'-m-dioxane]-3,20-dione 20-monoethylene glycol ketal. |
| A44 | 2-hydroxymethylene-17α-methyl-4-pregnene-3,20-dione 20-monoethylene glycol ketal. | 4'-hydroxy-17α-methyl-spiro-[4-pregnene-2,5'-m-dioxane]-3,20-dione 20-monoethylene glycol ketal. |
| A45 | 2-hydroxymethylene-4-pregnene-7β,11β-diol-3,20-dione 20-monoethylene glycol ketal. | 4',7β,11β-trihydroxy-spiro-[4-pregnene-2,5'-m-dioxane]-3,20-dione 20-monoethylene glycol ketal. |
| A46 | 2-hydroxymethylene-12α-chloro-4-pregnene-17α,21-diol-3,11,20-trione 20-monoethylene glycol ketal. | 4',17α,21-trihydroxy-12α-chlorospiro[4-pregnene-2,5'-m-dioxane]-3,11,20-trione 20-monoethylene glycol ketal. |
| A47 | 2-hydroxymethylene-18,19-bisnor-4-pregnene-3,20-dione 20-monoethylene glycol ketal. | 4'-hydroxyspiro[18,19-bisnor-4-pregnene-2,5'-m-dioxane]-3,20-dione 20-monoethleyne glycol ketal. |
| A48 | 2-hydroxymethyleneallopregnane-3,7,20-trione 7,20-bis(ethylene glycol ketal). | 4'-hydroxyspiro[allo-pregene-2,5'-m-dioxane]-3,7,20-trione 7,20-bis-(ethylene glycol ketal). |
| A49 | 2-hydroxymethylene-9α-fluoro-4-pregnene-11β,17α,21-triol-3,20-dione 17,20;20,21-bis-methylenedioxy derivative. | 4',11β,17α,21-tetrahydroxy-9α-fluorospiro[4-pregnene-2,5'-m-dioxane]-3,20-dione 17,20;20,21-bismethylenedioxy derivative. |
| A50 | 2-hydroxymethylene-4,4-dimethyl-5-pregnene-3,20-dione 20-monoethylene glycol ketal. | 4'-hydroxy-4,4-dimethyl-spiro-[5-pregnene-2,5'-m-dioxane]-3,20-dione 20-monoethylene glycol ketal. |
| A51 | 2-hydroxymethylene-6α,7α-epoxy-4-pregnene-3,20-dione 20-monoethylene glycol ketal. | 4'-hydroxy-6α,7α-epoxy-spiro-[4-pregnene-2,5'-m-dioxane]-3,20-dione 20-monoethylene glycol ketal. |
| A52 | 2-hydroxymethylene-6α-chloro-4-pregnene-3,20-dione 20-monoethylene glycol ketal. | 4'-hydroxy-6α-chlorospiro-[4-pregnene-2,5'-m-dioxane]-3,20-dione 20-monoethylene glycol ketal. |

(B) 2-METHYLENE-STEROIDS

Example B1

(a) 2-methylene-4-pregnene-3,20-dione 20-mono ethylene glycol ketal.—To a solution of 10.0 g. of 4'-hydroxy-spiro[4-pregnene-2,5'-m-dioxane]-3,20 - dione 20-monoethylene glycol ketal [Example A1, part (a)] in 1000 ml. of acetone was added 10.0 g. of powdered anhydrous potassium carbonate. The mixture was stirred for seven hours at room temperature and then kept at about 0° C. for about sixteen hours. The mixture was then poured into 3 liters of water, stirred well and allowed to stand for one hour. The product was collected by filtration and recrystallized twice from ether containing a few drops of pyridine to give 2-methylene-4-pregnene-3,20-dione 20-monoethylene glycol ketal in the form of pale yellow prisms, M.P. 166.8–169.6° C. (corr.); $[\alpha]_D^{25}+=146.8°$ (1% in chloroform); ultraviolet maximum at 260 mμ (ε=14,300); infrared absorption at 3.41, 3.47, 6.00, 6.19, 6.78–6.96, 11.03 and 11.25μ.

2-methylene-4-pregnene-3,20-dione 20 - monoethylene glycol ketal caused promotion of growth when administered subcutaneously to mature female rats at a dose level of 10 mg./kg./day.

(b) 2-methylene-4-pregnene-3,20-dione.—A mixture of 20.58 g. of 2-methylene-4-pregnene-3,20-dione 20-monoethylene glycol ketal and 200 ml. of 80% aqueous acetic acid was heated on a steam bath for seven minutes and then kept at room temperature for two hours. The reaction mixture was added to 2 liters of water, and the product was collected by filtration and recrystallized twice from ether to give 2-methylene-4-pregnene-3,20-dione in the form of off-white needles, M.P. 157.2–158.4° C. (corr.), $[\alpha]_D^{25} = +249.6°$ (1% in chloroform); ultraviolet maximum at 258–9 m$\mu$ ($\epsilon = 14,400$); infrared absorption at 3.25, 3.32, 3.42, 3.51, 5.90, 6.01, 6.19, 6.76, 6.88 and 6.96$\mu$.

2 - methylene-4-pregnene-3,20-dione showed progestational activity by positive endometrial response when administered to estrogen-primed immature female rabbits intramuscularly at a dose level of 20 mg./kg./day, or orally at a dose level of 80 mg./kg./day.

Example B2

2-methylene-4-androsten-17$\beta$-ol-3-one can be prepared from 4′,17$\beta$-dihydroxyspiro[4-androstene-2,5′-m-dioxan]-3-one [Example A2, part (a)] and potassium carbonate in acetone according to the procedure described above in Example B1, part (a).

Example B3

2-methylene-17$\alpha$ - methyl-4-androsten-17$\beta$-ol-3-one was prepared from 31.41 g. of 4′,17$\beta$-dihydroxy-17$\alpha$-methylspiro[4-androstene - 2,5′-m-dioxan]-3-one [Example A3, part (a)] and 30 g. of potassium carbonate in 1600 ml. of acetone according to the procedure described above in Example B1, part (a). The product had the M.P. 184–187° C. (uncorr.) and was used directly in Example C3 below without further purification.

Example B4

2 - methylene-17$\alpha$-ethynyl-4-androsten-17$\beta$-ol-3-one was prepared from 8.1 g. of 4′,17$\beta$-dihydroxy-17$\alpha$-ethynylspiro[4 - androstene-2,5′-m-dioxan]-3-one [Example A4, part (a)] and 8.1 g. of potassium carbonate in 300 ml. of acetone according to the procedure described above in Example B1, part (a). The product had the M.P. 169–172° C. (uncorr.) and was used directly in Example C4 below without further purification.

2-methylene - 17$\alpha$ - ethynyl - 4-androsten-17$\beta$-ol-3-one was also produced by passing a solution of 4′,17$\beta$-dihydroxy - 17$\alpha$ - ethynylspiro[4-androstene-2,5′-m-dioxan]-3-one [Example A4, part (a)] in benzene through a column of aluminium oxide.

Example B5

2-methylene-19-nor-4-androsten-17$\beta$-ol-3-one was prepared from 25.7 g. of 4′,17$\beta$-diacetoxyspiro[19-nor-4-androstene-2,5′-m-dioxan]-3-one (Example A5) and 75 g. of potassium carbonate in 1200 ml. of acetone according to the procedure described above in Example B1, part (a). The product was chromatographed on silica gel, eluted with benzene and with benzene-ether mixtures, and finally recrystallized from ether and from ethyl acetate to give 2-methylene - 19 - nor-4-androsten-17$\beta$-ol-3-one, M.P. 122.6–124.6° C. (corr.); $[\alpha]_D^{25} = +63.3°$ (1% in chloroform).

Example B6

(a) 2-methylene - 4 - pregnen-17$\alpha$ - ol-3,20-dione 20-monoethylene glycol ketal was prepared from 10.6 g. of 4′,17$\alpha$-dihydroxyspiro[4 - pregnene-2,5′-m-dioxane]-3,20-dione 20-monoethylene glycol ketal (Example A6) and 20 g. of potassium carbonate in 1800 ml. of acetone according to the procedure described above in Example B1, part (a). The product was obtained in the form of pale yellow plates, M.P. 213.0–217.0° C. (corr.) when recrystallized from acetone; $[\alpha]_D^{25} = +99.1°$ (1% in chloroform); ultraviolet maximum at 259 m$\mu$ ($\epsilon = 14,000$); infrared absorption at 2.81, 2.93, 3.42, 3.49, 3.52, 5.99, 6.18 and 6.85–6.97$\mu$.

2-methylene - 4 - pregnen-17$\alpha$-ol-3,20-dione 20-monoethylene glycol ketal showed progestational activity by positive endometrial response when administered intramuscularly to estrogen-primed immature female rabbits at a dose level of 20 mg./kg./day.

(b) 2-methylene-4-pregnen-17$\alpha$-ol-3,20-dione was prepared by hydrolysis of 5.95 g. of 2-methylene-4-pregnen-17$\alpha$-ol-3,20-dione 20-monoethylene glycol ketal with 100 ml. of 80% aqueous acetic acid according to the procedure described above in Example B1, part (b). The product was obtained in the form of pale yellow crystals, M.P. 173.0–176.8° C. (corr.) when recrystallized from an acetone-methanol mixture and from ether;

$$[\alpha]_D^{25} = +131.1°$$

(1% in chloroform); ultraviolet maximum at 260.5 m$\mu$ ($\epsilon = 14,400$); infrared absorption at 2.93, 3.42, 3.49, 5.87, 6.05, 6.22, 6.88 and 6.94$\mu$.

(c) 17$\alpha$-acetoxy-2-methylene-4-pregnene-3,20-dione.—A mixture of 10.0 g. of 2-methylene-4-pregnen-17$\alpha$-ol-3,20-dione, 5.0 g. of calcium carbonate and 100 ml. of acetic anhydride was heated and stirred at 120° C. in a dry nitrogen atmosphere for 24 hours. The reaction mixture was diluted with water, the product collected by filtration, dissolved in pentane-ether (19:1) and chromatographed on a column of 350 g. of activated magnesium silicate. The column was eluted with pentane containing gradually increasing proportions of ether; pentane-ether (1:1) brought out the desired product which was recrystallized twice from acetone to give 17$\alpha$-acetoxy-2-methylene-4-pregnene-3,20 - dione, colorless rods, M.P. 225–227.5° C., $[\alpha]_D^{25} = +115.9°$ (1% in chloroform).

17$\alpha$-acetoxy-2-methylene-4-pregnene-3,20-dione showed high progestational activity by positive endometrial response when administered orally to estrogen-primed immature female rabbits at a dose level of 2.0 mg./kg./day.

Example B7

2 - methylene - 17$\alpha$ - ethynyl-19-nor-4-androsten-17$\beta$-ol-3-one was prepared from 34.7 g. of 4′,17$\beta$-dihydroxy-17$\alpha$-ethynylspiro[19-nor-4-androstene-2,5′-m-dioxan] - 3 - one (Example A7) and 30.0 g. of potassium carbonate in 1200 ml. of acetone according to the procedure described above in Example B1, part (a). The product was chromatographed on 750 g. of silica gel and eluted with benzene and with benzene-ether mixtures. Benzene-ether 9:1 brought out the desired compound which was used directly in Example C7 below without further purification; ultraviolet maximum at 255 m$\mu$ ($\epsilon = 11,600$); infrared absorption at 2.94, 3.07, 3.44, 3.50, 4.76, 6.04 and 6.20$\mu$.

Example B7A

2 - methylene - 17,20:20,21-bis(methylenedioxy)-4-pregnene-3,11-dione, colorless needles, M.P. 200–204° C., $[\alpha]_D^{25} = +99.7°$ (1% in chloroform) (recrystallized from acetone), was prepared by reacting 2-hydroxymethylene-17,20:20,21-bis(methylenedioxy)-4-pregnene - 3,11 - dione with formaldehyde and then reacting the intermediate 4′ - hydroxy - 17,20:20,21 - bis(methylenedioxy)-spiro[4-pregnene-2,5′-m-dioxane]-3,20-dione with potassium carbonate according to the procedures of Examples A1 and B1.

Example B7B

2 - methylene - 6$\alpha$ - methyl-4-pregnen-17$\alpha$-ol-3,20-dione 20-monoethylene glycol ketal, M.P. 210–215° C. was prepared by reacting 2-hydroxymethylene-6$\alpha$-methyl-4-pregnen-17$\alpha$-ol-3,20-dione 20-monoethylene glycol ketal with formaldehyde and then reacting the intermediate 4′,17$\alpha$ - dihydroxy - 6$\alpha$ - methylspiro[4 - pregnene-2,5′-m-dioxane]-3,20-dione 20-monoethylene glycol ketal with potassium carbonate according to the procedures of Examples A1 and B1.

According to the foregoing procedures the following compounds can be prepared:

| Ex. | Starting material | Final product |
|---|---|---|
| B8 | 4',17β-dihydroxy-17α-ethyl-spiro[4-androstene-2,5'-m-dioxan]-3-one. | 2-methylene-17α-ethyl-4-androsten-17β-ol-3-one. |
| B9 | 4',17β-dihydroxy-17α-vinyl-spiro[4-androstene-2,5'-m-dioxan]-3-one. | 2-methylene-17α-vinyl-4-androsten-17β-ol-3-one. |
| B10 | 4',17β-dihydroxy-17α-methyl-spiro[5α-androstane-2,5'-m-dioxan]-3-one. | 2-methylene-17α-methyl-5α-androstan-17β-ol-3-one. |
| B11 | 4',17β-dihydroxy-17α-methyl-spiro[5β-androstane-2,5'-m-dioxan]-3-one. | 2-methylene-17α-methyl-5β-androstan-17β-ol-3-one. |
| B12 | 4',17β-dihydroxy-17α-methyl-spiro[19-nor-5α-androstane-2,5'-m-dioxan]-3-one. | 2-methylene-17α-methyl-19-norandrostan-17β-ol-3-one. |
| B13 | 4',17β-dihydroxy-17α-ethyl-spiro[5α-androstane-2,5'-m-dioxan]-3-one. | 17α-ethyl-2-methylene-5α-androstan-17β-ol-3-one. |
| B14 | 4'-hydroxyspiro[allopregnane-2,5'-m-dioxane]-3,20-dione-20-ethylene-glycol ketal. | 2-methyleneallopregnane-3,20-dione 20-ethylene-glycol ketal. |
| B15 | 4'-hydroxyspiro[pregnane-2,5'-m-dioxane]3,20-dione. | 2-methylenepregnane-3,20-dione. |
| B16 | 4',17β-dihydroxyspiro[5α-androstane-2,5'-m-dioxan]-3-one. | 2-methylene-5α-androstan-17β-ol-3-one. |
| B17 | 4'-hydroxyspiro[4,6-androstadiene-2,5'-m-dioxan]-3-one. | 2-methylene-4,6-androstadien-17β-ol-3-one. |
| B18 | 4',20β-dihydroxyspiro[4-pregnene-2,5'-m-dioxan]-3-one. | 2-methylene-4-pregnen-20β-ol-3-one. |
| B19 | 4',17β-dihydroxy-4,4,17α-trimethylspiro[5-androstene-2,5'-m-dioxan]-3-one. | 2-methylene-4,4,17α-trimethyl-5-androsten-17β-ol-3-one. |
| B20 | 4',17β-dihydroxy-4,4-dimethylspiro[5-androstene-2,5'-m-dioxan]-3-one. | 2-methylene-4,4-dimethyl-5-androsten-17β-ol-3-one. |
| B21 | 4',17α,21-trihydroxy-spiro[4-pregnene-2,5'-m-dioxane]-3,11,20-trione. | 2-methylene-4-pregnene-17α,21-diol-3,11,20-trione. |
| B22 | 4',17β-dihydroxy-17α-ethynylspiro[5α-androstane-2,5'-m-dioxan]-3-one. | 2-methylene-17α-ethynyl-5α-androstan-17β-ol-3-one. |
| B23 | 4',17β-dihydroxy-17α-propargylspiro[5α-androstane-2,5'-m-dioxan]-3-one. | 2-methylene-17α-propargyl-5α-androstan-17β-ol-3-one. |
| B24 | 4',20,21-trihydroxyspiro[4-pregnene-2,5'-m-dioxan]-3-one. | 2-methylene-4-pregnene-20,21-diol-3-one. |
| B25 | 4',11β,17α,21-tetrahydroxy-9α-fluorospiro[4-pregnene-2,5'-m-dioxane]-3,20-dione 20-monoethylene glycol ketal. | 2-methylene-9-fluoro-4-pregnene-11β,17α,21-triol-3,20-dione 20-monothylene glycol ketal. |
| B26 | 4',16α,17α,21-tetrahydroxy-9β,11β-epoxyspiro-[4-pregnene-2,5'-m-dioxane]-3,20-dione 20-monoethylene glycol ketal. | 2-methylene-4-pregnene-16α,17α,21-triol-3,20-dione-9β,11β-oxide 20-monoethylene glycol ketal. |
| B27 | 4',17β-dihydroxy-17α-(1-propynyl)-6α-methylspiro-[4-androstene-2,5'-m-dioxan]-3-one. | 2-methylene-17α-propynyl-6α-methyl-4-androsten-17β-ol-3-one. |
| B28 | 4',11β,17α-trihydroxy-21-acetoxyspiro[4-pregnene-2,5'-m-dioxane]-3,20-dione 20-monoethylene glycol ketal. | 2-methylene-21-acetoxy-4-pregnene-11β,17α-diol-3,20 dione 20-monoethylene glycol ketal. |
| B29 | 4',17α-dihydroxy-21-acetoxy-spiro[4-pregnene-2,5'-m-dioxane]-3,20-dione 20-monoethylene glycol ketal. | 2-methylene-21-acetoxy-4-pregnene-17α-ol-3,20-dione 20-monoethylene glycol ketal. |
| B30 | 4',11β,16α,17α-tetrahydroxy-21-acetoxyspiro-[4-pregnene-2,5'-m-dioxane]-3,20-dione 20-monoethylene glycol ketal. | 2-methylene-21-acetoxy-4-pregnene-11β,16α,17α-triol-3,20-dione 20-monoethylene glycol ketal. |
| B31 | 4',11β,21-trihydroxyspiro[4,17(20)-pregnadiene-2,5'-m-dioxan]-3-one. | 2-methylene-4,17(20)-pregnadiene-11β,21-diol-3-one. |
| B32 | 4',6β,17β-trihydroxyspiro[5α-androstane-2,5'-m-dioxan]-3-one. | 2-methylene-5α-androstane-6β,17β-diol-3-one. |
| B33 | 4',17β-dihydroxy-17α-ethynyl-spiro[4-androstene-2,5'-m-dioxane]-3,11-dione. | 2-methylene-17α-ethynyl-4-androsten-17β-ol-3,11-dione. |
| B34 | 4',17β-dihydroxy-17α-methyl-spiro[4-androstene-2,5'-m-dioxane]-3,11-dione. | 2-methylene-17α-methyl-4-androsten-17β-ol-3,11-dione. |
| B35 | 4',17β-dihydroxyspiro[4-androstene-2,5'-m-dioxane]-3,11-dione. | 2-methylene-4-androsten-17β-ol-3,11-dione. |
| B36 | 4',6β,17β-trihydroxy-17α-methylspiro[4-androstene-2,5'-m-dioxan]-3-one. | 2-methylene-17α-methyl-4-androstene-6β,17β-diol-3-one. |
| B37 | 4',14α,17β-trihydroxyspiro[4-androstene-2,5'-m-dioxan]-3-one. | 2-methylene-4-androstene-14α,17β-diol-3-one. |
| B38 | 4',17β-dihydroxy-16β-methyl-spiro[4-androstene-2,5'-m-dioxan]-3-one. | 2-methylene-16β-methyl-4-androsten-17β-ol-3-one. |
| B39 | 4',11α,17β-trihydroxyspiro[4-androstene-2,5'-m-dioxan]-3-one. | 2-methylene-4-androstene-11α,17β-diol-3-one. |
| B40 | 4',17β-dihydroxy-4-bromo-17α-methylspiro[4-androstene-2,5'-m-dioxan]-3-one. | 2-methylene-4-bromo-17α-methyl-4-androsten-17β-ol-3-one. |
| B41 | 4',17β-dihydroxy-4-methyl-spiro[4-androstene-2,5'-m-dioxan]-3-one. | 2-methylene-4-methyl-4-androsten-17β-ol-3-one. |
| B42 | 4',12α,17β-trihydroxy-21-acetoxyspiro[4-pregnene-2,5'-m-dioxane]-3,20-dione 20-monoethylene glycol ketal. | 2-methylene-21-acetoxy-4-pregnene-12α,17β-diol-3,20-dione 20-monoethylene glycol ketal. |
| B43 | 4'-hydroxyspiro[4,11-pregnadiene-2,5'-m-dioxane]-3,20-dione 20-monoethylene glycol ketal. | 2-methylene-4,11-pregnadiene-3,20-dione 20-monoethylene glycol ketal. |
| B44 | 4'-hydroxy-17α-methyl-spiro[4-pregnene-2,5'-m-dioxane]-3,20-dione 20-monoethylene glycol ketal. | 2-methylene-17α-methyl-4-pregnene-3,20-dione 20-monoethylene glycol ketal. |
| B45 | 4',7β,11β-trihydroxy-spiro[4-pregnene-2,5'-m-dioxane]-3,20-dione 20-monoethylene glycol ketal. | 2-methylene-4-pregnene-7β,11β-diol-3,20-dione 20-monoethylene glycol ketal. |
| B46 | 4',17α,21-trihydroxy-12α-chlorospiro[4-pregnene-2,5'-m-dioxane]-3,11,20-trione 20-monoethylene glycol ketal. | 2-methylene-12α-chloro-4-pregnene-17α,21-diol-3,11,20-trione 20-monoethylene glycol ketal. |
| B47 | 4'-hydroxyspiro[18,19-bisnor-4-pregnene-2,5'-m-dioxane]-3,20-dione 20-monoethylene glycol ketal. | 2-methylene-18,19-bisnor-4-pregnene-3,20-dione 20-monoethylene glycol ketal. |
| B48 | 4'-hydroxyspiro[allo-pregnane-2,5'-m-dioxane]-3,7,20-trione 7,20-bis-(ethylene glycol ketal). | 2-methyleneallopregnane-3,7,20-trione 7,20-bis-(ethylene glycol ketal). |
| B49 | 4',11β,17α,21-tetrahydroxy-9α-fluorospiro[4-pregnene-2,5'-m-dioxane]-3,20-dione 17,20;20,21-bismethylenedioxy derivative. | 2-methylene-9α-fluoro-4-pregnene-11β,17α,21-triol-3,20-dione 17,20;20,21-bismethylenedioxy derivative. |
| B50 | 4'-hydroxy-4,4-dimethyl-spiro[5-pregnene-2,5'-m-dioxane]-3,20-dione 20-monoethylene glycol ketal. | 2-methylene-4,4-dimethyl-5-pregnene-3,20-dione 20-monoethylene glycol ketal. |
| B51 | 4'-hydroxy-6α,7α-epoxy-spiro[4-pregnene-2,5'-m-dioxane]-3,20-dione 20-monoethylene glycol ketal. | 2-methylene-6α,7α-epoxy-4-pregnene-3,20-dione 20-monoethylene glycol ketal. |
| B52 | 4'-hydroxy-6α-chloro-spiro[4-pregnene-2,5'-m-dioxane]-3,20-dione 20-monoethylene glycol ketal. | 2-methylene-6α-chloro-4-pregnene-3,20-dione 20-monoethylene glycol ketal. |

(C) PYRAZOLINES

Example C1

(a) Spiro[4 - pregnene - 2,3'(2'α) - 1'pyrazoline]-3,20-dione 20-monoethylene glycol ketal.—To a solution of 10.0 g. of 2-methylene-4-pregnene-3,20-dione 20-monoethylene glycol ketal [Example B1, part (a)] in 700 ml. of ether was added a solution of 2.8 g. of diazomethane in 100 ml. of ether (prepared from N-methyl-N-nitroso urea wet down with half its weight of 3% aqueous acetic acid). The reaction mixture was kept at room temperature for twenty-four hours and the precipitate which had formed was collected by filtration (7.71 g., M.P. 163–169° C.). The filtrate was treated with acetic acid until evolution of nitrogen ceased, then washed with water, dried, and concentrated to a small volume. In this way an additional 1 g. of product separated. The total product was recrystallized twice from acetone containing a trace of pyridine to give spiro[4-pregnene-2,3'(2'α)-1'-pyrazoline]-2,20-dione 20-monoethylene glycol ketal in the form of off-white prisms. M.P. 174.0–174.6° C. (dec.) (corr.); $[\alpha]_D^{25}=+185.2°$ (1% in chloroform); ultraviolet maxima at 246 and 320 m$\mu$ ($\epsilon$=16,900 and 370); infrared absorption at 3.42, 3.48, 6.04, 6.20, 6.43 and 6.88$\mu$.

(b) Spiro[4 - pregnene - 2,3'(2'α) - 1'-pyrazoline]-3,20-dione [IV–C (Δ$^4$); R is β-COCH$_3$, R' is H, X is H$_2$, Y and Y' are CH$_3$, Z is H] was prepared from 11.7 g. of 2 - methylene - 4 - pregnene-3,20-dione [Example B1, part (b)] and 2.8 g. of diazomethane according to the procedure described above in part (a). The product was obtained in the form of colorless needles, M.P. 156.4–157.0° C. (dec.)(corr.) when recrystallized from acetone; $[\alpha]_D^{25}=+287.5°$ (1% in chloroform); ultraviolet maxima at 246 and 320 m$\mu$ ($\epsilon$=16,900 and 250); infrared absorption at 3.40, 3.45–3.50, 5.87, 6.00, 6.18, 6.35–6.40, 6.87 and 6.92–6.96$\mu$.

Example C2

17β - hydroxyspiro[4 - androstene-2,3'(2'α)-1'-pyrazolin]-3-one [IV–C(Δ⁴); R and R' are H, X is H₂, Y and Y' are CH₃, Z is β-OH] can be prepared from 2-methylene-4-androsten-17β-ol-3-one (Example B2) and diazomethane according to the procedure described above in Example C1, part (a).

Example C3

17β - hydroxy-17α-methylspiro[4-androstene-2,3'(2'α)-1'-pyrazolin]-3-one [IV–C (Δ⁴); R is α-CH₃, R' is H, X is H₂, Y and Y' are CH₃, Z is β-OH] was prepared from 10.62 g. of 2-methylene-17α-methyl-4-androsten-17β-ol-3-one (Example B3) and 2.8 g. of diazomethane according to the procedure described above in Example C1, part (a). The product was obtained in the form of colorless needles, M.P. 160.0–161.0° C. (dec.)(corr.), when recrystallized from acetone; [α]$_D^{25}$=+208.2° (1% in chloroform); ultraviolet maxima at 247 and 330 mμ (ε=16,600 and 330); infrared absorption at 2.91, 2.99, 3.43, 3.52, 6.01, 6.07, 6.19, 6.44, 6.81, 6.90 and 6.99μ.

Example C4

17β - hydroxy-17α-ethynylspiro[4-androstene-2,3'(2'α)-1'-pyrazolin]-3-one [IV–C (Δ⁴); R is α-C≡CH, R' is H, X is H₂, Y and Y' are CH₃, Z is β-OH] was prepared from 6.79 g. of 2-methylene-17α-ethynyl-4-androsten-17β-ol-3-one (Example B4) and 2.8 g. of diazomethane according to the procedure described above in Example C1, part (a). The product was obtained in the form of colorless needles, M.P. 181.0–181.5° C. (dec.)(corr.); [α]$_D^{25}$=+136.7° (1% in chloroform); ultraviolet maxima at 246 and 320 mμ (ε=16,500 and 300); infrared absorption at 3.00, 3.08, 3.36, 3.43, 3.46, 3.54, 4.79, 6.08, 6.21, 6.45, 6.81, 6.90–6.94 and 6.99μ.

Example C5

17β - hydroxyspiro[19-nor-4-androstene-2,3'(2'α)-1'-pyrazolin]-3-one [IV–C (Δ⁴); R and R' are H, X is H₂, Y is H, Y' is CH₃, Z is β-OH] was prepared from 5.98 g. of 2 - methylene-19-nor-4-androsten-17β-ol-3-one (Example B5) and 2.8 g. of diazomethane according to the procedure described above in Example C1, part (a). The product was obtained in the form of colorless needles, M.P. 153.0–153.8° C. (dec.)(corr.) when recrystallized from acetone; [α]$_D^{25}$=−289.5° (1% in chloroform); ultraviolet maxima at 220, 248 and 336 mμ (ε=6500, 15,800 and 500); infrared absorption at 3.00–3.10, 3.44, 3.51, 6.00, 6.18, 6.45, 6.80, 6.89 and 7.00μ.

Example C6

17α - hydroxyspiro[4-pregnene-2,3'(2'α)-1'-pyrazoline]-3,20-dione [IV–C (Δ⁴); R is COCH₃, R' is H, X is H₂, Y and Y' are CH₃, Z is α-OH] was prepared from 17.70 g. of 2-methylene-4-pregnen-17α-ol-3,20-dione [Example B6, part (b)] and 5.6 g. of diazomethane according to the procedure described above in Example C1, part (a). The product was obtained in the form of colorless needles, M.P. 177.0–178.0° C. (dec.)(corr.) when recrystallized from acetone; [α]$_D^{25}$=+193.4° (1% in chloroform); ultraviolet maxima at 237 and 246 mμ (ε=17,250 and 17,900); infrared absorption at 2.99–3.08, 3.45, 5.90, 6.01, 6.20, 6.40 and 6.95μ.

The 20-monoethylene glycol ketal, M.P. 175–177° C. (dec.), [α]$_D^{25}$=+147.1° (1% in chloroform) was prepared by reacting 2 - methylene-4-pregnen-17β-ol-3,20-dione 20-monoethylene glycol ketal (Example B6) with diazomethane.

Example C7

17β - hydroxy-17α-ethynylspiro[19-nor-4-androstene-2,3'(2'α)-1'-pyrazolin]-3-one [IV–C (Δ⁴); R is α-C≡CH, R' is H, X is H₂, Y is H, Y' is CH₃, Z is β-OH] was prepared from 8.91 g. of 2-methylene-17α-ethynyl-19-nor-4-androsten-17β-ol-3-one (Example B7) and 2.8 g. of diazomethane according to the procedure described above in Example C1, part (a). The product obtained was used directly in Example D7 below without further purification; ultraviolet maximum at 246 mμ (ε=11,000); infrared absorption at 2.95, 3.07, 3.45, 3.53, 3.77, 5.78, 6.02, 6.19, 6.45 and 6.90μ.

Example C7A 17,20:20,21 - bis(methylenedioxy)spiro[4-pregnene-2,3'(2'α)-1'-pyrazoline]-3,11-dione was prepared by reacting 2 - methylene - 17,20:20,21 - bis(methylenedioxy)-4-pregnene-3,11-dione (Example B7A) with diazomethane. The product was an oil which was converted directly to the 2,2-ethylene compound as described below in Example D7A.

Example C7B

6α-methyl - 17a-hydroxyspiro[4-pregnene-2,3'(2'α)-1'-pyrazoline] - 3,20 - dione 20-monoethylene glycol ketal, M.P. 178° C. (dec.) was prepared by reacting 2-methylene - 6α-methyl-4-pregnen-17α-ol-3,20-dione 20 monoethylene glycol ketal with diazomethane.

In the foregoing preparations, thin layer chromatographic analysis of the reaction products indicated the presence of the isomeric 5'-pyrazoline compounds (IV–D).

According to the foregoing procedures the following compounds can be prepared:

| Ex. | Starting material | Final product |
|---|---|---|
| C8 | 2-methylene-17α-ethyl-4-androsten-17β-ol-3-one. | 4',17β dihydroxy-17α-ethyl-sprio[4-androstene-2,3-(2α')-1'-pyrazolin]-3-one. |
| C9 | 2-methylene-17α-vinyl-4-androsten-17β-ol-3-one. | 4',17β-dihydroxy-17α-vinyl-spiro[4-androstene-2,3'(2'α)-1'-pyrazolin]-3-one. |
| C10 | 2-methylene-17α-methyl-5α-androstan-17β-ol-3-one. | 4',17β-dihydroxy-17α-methyl-spiro[5α-androstane-2,3'(2'α)-1'-pyrazolin]-3-one. |
| C11 | 2-methylene-17α-methyl-5β-androstan-17β-ol-3-one. | 4',17β-dihydroxy-17α-methyl-spiro[5β-androstane-2,3'(2'α)-1'-pyrazolin]-3-one. |
| C12 | 2-methylene-17α-methyl-19-norandrostan-17β-ol-3-one. | 4',17β-dihydroxy-17α-methyl-spiro[19-nor-5α-androstane-2,3'(2'α)-1'-pyrazolin]-3-one. |
| C13 | 17α-ethyl-2-methylene-5α-androstan-17β-ol-3-one. | 4',17β-dihydroxy-17α-ethyl-spiro[5α-androstane-2,3'(2α')-1'-pyrazolin]-3-one. |
| C14 | 2-methyleneallopregnane-3,20-dione 20-ethylene glycol ketal. | 4'-hydroxyspiro[allo-pregnane-2,3'(2'α)-1'-pyrazoline]-3,20-dione 20-ethylene glycol ketal. |
| C15 | 2-methylenepregnane-3,20-dione. | 4'-hydroxyspiro[pregnane-2,3'(2'α)-1'-pyrazoline]-3,20-dione. |
| C16 | 2-methylene-5α-androstan-17β-ol-3-one. | 4',17β-dihydroxyspiro-[5α-androstane-2,3'(2'α)-1'-pyrazolin]-3-one. |
| C17 | 2-methylene-4,6-androstadien-17β-ol-3-one. | 4'-hydroxyspiro[4,6-androstadiene-2,3'(2'α)-1'-pyrazolin]-3-one. |
| C18 | 2-methylene-4-pregnen-20β-ol-3-one. | 4',20β-dihydroxyspiro-[4-pregnene-2,3'(2'α)-1'-pyrazolin]-3-one. |
| C19 | 2-methylene-4,4,17α-trimethyl-5-androsten-17β-ol-3-one. | 4',17β-dihydroxy-4,4,17α-trimethylspiro[5-androstene-2,3'(2'α)-1'-pyrazolin]-3-one. |
| C20 | 2-methylene-4,4-dimethyl-5-androsten-17β-ol-3-one. | 4',17β-dihydroxy-4,4-dimethyl-spiro[5-androstene-2,3'(2'α)-1'-pyrazolin]-3-one. |
| C21 | 2-methylene-4-pregnene-17α,21-diol-3,11,20-trione. | 4',17α,21-trihydroxyspiro[4-pregnene-2,3'-(2'α)-1'-pyrazoline]-3,11,20-trione. |
| C22 | 2-methylene-17α-ethynyl-5α-androstan-17β-ol-3-one. | 4',17β-dihydroxy-17α-ethynyl-spiro[5α-androstane-2,3'(2'α)-1'-pyrazolin]-3-one. |
| C23 | 2-methylene-17α-propargyl-5α-androstan-17β-ol-3-one. | 4',17β-dihydroxy-17α-propargylspiro[5α-androstane-2,3'(2'α)-1'-pyrazolin]-3-one. |
| C24 | 2-methylene-4-pregnene-20,21-diol-3-one. | 4',20,21-trihydroxyspiro-[4-pregnene-2,3'(2'α)-1'-pyrazolin]-3-one. |
| C25 | 2-methylene-9-fluoro-4-pregnene-11β,17α,21-triol-3,20-dione 20-monoethylene glycol ketal. | 4',11β,17α,21-tetra-hydroxy-9α-fluorospiro[4-pregnene-2,3'(2'α)-1'-pyrazoline]-3,20-dione 20-monoethylene glycol ketal. |
| C26 | 2-methylene-4-pregnene-16α,17α,21-triol-3,20-dione-9β,11β-oxide 20-monoethylene glycol ketal. | 4',16α,17α,21-tetrahydroxy-9β,11β,epoxyspiro[4-pregnene-2,3'(2'α)-1'-pyrazoline]-3,20-dione 20-monoethylene glycol ketal. |
| C27 | 2-methylene-17α-propynyl-6α-methyl-4-androsten-17β-ol-3-one. | 4',17β-dihydroxy-17α(1-propynyl)-6α-methylspiro[4-androstene-2,3'(2'α)-1'-pyrazolin]-3-one. |

| Ex. | Starting material | Final product |
|---|---|---|
| C28 | 2-methylene-21-acetoxy-4-pregnene-11β,17α-diol-3,20-dione 20-monoethylene glycol ketal. | 4',11β,17α-trihydroxy-21-acetoxyspiro[4-pregnene-2 3'(2'α)-1'-pyrazoline]-3,20-dione 20-monoethylene glycol ketal. |
| C29 | 2-methylene-21-acetoxy-4-pregnen-17α-ol-3,20-dione 20-monoethylene glycol ketal. | 4',17α-dihydroxy-21-acetoxyspiro[4-pregnene-3,3'(2'α)-1'-pyrazoline]-3,20-dione 20-monoethylene glycol ketal. |
| C30 | 2-methylene-21-acetoxy-4-pregnene-11β,16α,17α-triol-3,20-dione 20-monoethylene glycol ketal. | 4',11β,16α,17α-tetra-hydroxy-21-acetoxyspiro-[4-pregnene 2,3'(2'α)-1'-pyrazoline]-3,20-dione 20-monoethylene glycol ketal. |
| C31 | 2-methylene-4,17(20)-pregnadiene-11β,21-diol-3-one. | 4',11β,21-trihydroxyspiro[4,17(20)-pregnadiene-2,3'(2'α)-1'-pyrazolin]-3-one. |
| C32 | 2-methylene-5α-androstane-6β,17β-diol-3-one. | 4',6β,17β-trihydroxyspiro[5α-androstane-2,3'(2'α)-1'-pyrazolin]-3-one. |
| C33 | 2-methylene-17α-ethynyl-4-androsten-17β-ol-3,11-dione. | 4',17α-ethynylspiro[4-androstene-2,3'(2'α)-1'-pyrazoline]-3,11-dione. |
| C34 | 2-methylene-17α-methyl-4-androsten-17β-ol-3,11-dione. | 4',17β-dihydroxy-17α-methylspiro[4-androstene-2,3'(2'α)-1'-pyrazoline]-3,11-dione. |
| C35 | 2-methylene-4-androsten-17β-ol-3,11-dione. | 4',17β-dihydroxyspiro[4-androstene-2,3'(2'α)-1'-pyrazoline]-3,11-dione. |
| C36 | 2-methylene-17α-methyl-4-androstene-6β,17β-diol-3-one. | 4',6β,17β-trihydroxy-17α-methylspiro[4-androstene-2,3'(2'α)-1'-pyrazolin]-3-one. |
| C37 | 2-methylene-4-androstene-14α,17β-diol-3-one. | 4'14α,17β-trihydroxyspiro[4-androstene-2,3'(2'α)-1'-pyrazolin]-3-one. |
| C38 | 2-methylene-16β-methyl-4-androsten-17β-ol-3-one. | 4',17β-dihydroxy-16β-methylspiro[4-androstene-2,3'(2'α)-1'-pyrazolin]-3-one. |
| C39 | 2-methylene-4-androstene-11α,17β-diol-3-one. | 4',11α,17β-trihydroxyspiro[4-androstene-2,3'(2'α)-1'-pyrazolin]-3-one. |
| C40 | 2-methylene-4-bromo-17α-methyl-4-androsten-17β-ol-3-one. | 4',17β-dihydroxy-4-bromo-17α-methylspiro[4-androstene-2,3'(2'α)-1'-pyrazolin]-3-one. |
| C41 | 2-methylene-4-methyl-4-androsten-17β-ol-3-one. | 4',17β-dihydroxy-4-methylspiro[4-androstene-2,3'(2'α)-1'-pyrazolin]-3-one. |
| C42 | 2-methylene-21-acetoxy-4-pregnene-12α,17α-diol-3,20-dione 20-monoethylene gylcol ketal. | 4',12α,17α-trihydroxy-21-acetoxyspiro[4-pregnene-2,3'(2'α)-1'-pyrazoline]-3,20-dione 20-monoethylene glycol ketal. |
| C43 | 2-methylene-4,11-pregnadiene-3,20-dione 20-monoethylene glycol ketal. | 4'-hydroxyspiro[4,11-pregnadiene-2,3'(2'α)-1'-pyrazoline]-3,20-dione 20-monoethylene glycol ketal. |
| C44 | 2-methylene-17α-methyl-4-pregnene-3,20-dione 20-monoethylene glycol ketal. | 4'-hydroxy-17α-methyl-2,3'(2'α)-1'-pyrazoline]-3,20-dione 20-monoethylene glycol ketal. |
| C45 | 2-methylene-4-pregnene-7β,11β-diol-3,20-dione 20-monoethylene glycol ketal. | 4',7β,11β-trihydroxyspiro'4-pregnene-2,3'-(2'α)-1'-pyrazoline]-3,20-dione 20-monoethylene glycol ketal. |
| C46 | 2-methylene-12α-chloro-4-pregnene-17α,21-diol-3,11,20-trione 20-monoethylene glycol ketal. | 4',17α,21-trihydroxy-12α-chlorospiro[4-pregnene-2,3'(2'α)-1'-pyrazoline]-3,11,20-trione 20-monoethylene glycol ketal. |
| C47 | 2-methylene-18,19-bisnor-4-pregnene-3,20-dione 20-monoethylene glycol ketal. | 4'-hydroxyspiro[18,19-bisnor-4-pregenene-2,3'(2'α)-1'-pyrazoline]-3,20-dione 20-monoethylene glycol ketal. |
| C48 | 2-methyleneallopregnane-3,7,20-trione 7,20-bis(ethylene glycol ketal). | 4'-hydroxyspiro[allopregnane-2,3'(2'α)-1'-pyrazoline]-3,7,20-trione 7,20-bis(ethylene glycol ketal). |
| C49 | 2-methylene-9α-fluoro-4-pregnene-11β,17α,21-triol-3,20-dione 17,20;20,21-bismethylenedioxy derivative. | 4',11β,17α,21-tetrahydroxy-9α-fluorospiro-[4-pregnene-2,3'(2'α)-1'-pyrazoline]-3,20-dione 17,20;20,21-bismethylenedioxy derivative. |
| C50 | 2-methylene-4,4-dimethyl-5-pregnene-3,20-dione 20-monothylene glycol ketal. | 4'-hydroxy-4,4-dimethyl-spiro[4-pregnene-2,3'(2'α)-1'-pyrazoline]-3,20-dione 20-monoethylene glycol ketal. |
| C51 | 2-methylene-6α,7α-epoxy-4-pregnene-3,20-dione 20-monoethylene glycol ketal. | 4'-hydroxy-6α,7α-epoxy-spiro[4-pregnene-2,3'-(2'α)-1'-pyrazoline]-3,20-dione 20-monoethylene glycol ketal. |
| C52 | 2-methylene-6α-chloro-4-pregnene-3,20-dione 20-monoethylene glycol ketal. | 4'-hydroxy-6α-chlorosporo[4-pregnene-2,3'-(2'α)-1'-pyrazoline]-3,20-dione 20-monoethylene glycol ketal. |

(D) 2,2-ETHYLENE-STEROIDS

Example D1

2,2-ethylene-4-pregnene-3,20-dione [V–A (Δ$^4$); R is β-COCH$_3$, R" is H, X is H$_2$, Y and Y' are CH$_3$, Z is H].—To a solution of 4.76 g. of spiro[4-pregnene-2,3'(2'α)-1'-pyrazoline]-3,20-dione [Example C1, part (b)] in 120 ml. of acetone were added 4 drops of boron trifluoride etherate. After standing for fifteen minutes an additional 4 drops of boron trifluoride etherate were added, and again after forty-five minutes another 4 drops of boron trifluoride etherate were added. The reaction mixture was allowed to stand for about sixteen hours then added to water. The solid product was collected by filtration, dissolved in benzene and chromatographed on Florisil (activated magnesium silicate). The column was eluted with pentane-ether 19:1-4:1 and recrystallized from methanol to give 2,2-ethylene-4-pregnene-3,20-dione in the form of colorless needles, M.P. 160.0–161.8° C. (corr.); $[α]_D^{25}$=+125.7° (1% in chloroform); ultraviolet maximum at 242 mμ ($ε$=16,400); infrared absorption at 5.88, 6.01, 6.19, 9.74, 11.55 and 12.23μ.

2,2-ethylene-4-pregnene-3,20-dione showed moderate to high progestational activity by positive endometrial response when administered to estrogen-primed immature female rabbits orally at a dose level of 10 mg./kg./day or intramuscularly at a dose level of 20 mg./kg./day.

Example D2

2,2-ethylene-4-androsten-17β-ol-3-one [V–A (Δ$^4$); R and R" are H, X is H$_2$, Y and Y' are CH$_3$, Z is β-OH] can be prepared by treating 17β-hydroxyspiro[4-androstene-2,3'(2'α)-1'-pyrazolin]-3-one (Example C2) with boron trifluoride according to the procedure described above in Example D1.

Example D3

2,2 - ethylene - 17α - methyl-4-androsten-17β-ol-3-one [V–A (Δ$^4$); R is α-CH$_3$, R" is H, X is H$_2$, Y and Y' are CH$_3$, Z is β-OH].—A solution of 5.85 g. of 17β-hydroxy-17α - methylspiro[4 - androstene-2,3'(2'α)-1'-pyrazolin]-3-one (Example C3) in 60 ml. of 80% aqueous acetic acid was heated for one hour on a steam bath and then concentrated to dryness in vacuo. The residue was dissolved in benzene and chromatographed on 500 g. of silica gel. The column was eluted with pentane-ether 19:1-1:1 and the product recrystallized from acetone to give 2,2-ethylene-17α-methyl-4-androsten-17β-ol-3-one in the form of colorless rods, M.P. 158.0–160.0° C. (corr.); $[α]_D^{25}$=+13.5° (1% in chloroform); ultraviolet maximum at 242 mμ ($ε$=15,700); infrared absorption at 3.05, 3.42, 3.45, 3.53, 3.57, 5.97, 6.19, 6.22, 6.81, 6.92 and 6.98μ.

Further elution of the chromatograph column with ether-methanol (99:1-19:1) brought out a second substance which was recrystallized from acetone to give 17β-hydroxy - 17α - methylspiro[4-androstene-2,3'(2'α)-5'-pyrazolin]-3-one [IV–D (Δ$^4$); R is α-CH$_3$, R' is H, X is H$_2$, Y and Y' are CH$_3$, Z is β-OH], colorless needles, M.P. 195–200° C.(uncorr.); ultraviolet maximum at 241 Mμ ($ε$=16,600); infrared absorption at 3.05, 3.42, 3.45, 3.53, 3.57, 5.97, 6.19, 6.22, 6.81, 6.92 and 6.98μ. This compound is isomeric with the compound of Example C3, and by further heating with acid it can be converted to 2,2-ethylene-17α-methyl-4-androsten-17β-ol-3-one.

Example D4

2,2 - ethylene - 17α-ethynyl-4-androsten-17β-ol-3-one [V–A (Δ$^4$); R is α-C≡CH, R" is H, X is H$_2$, Y and Y' are CH$_3$, Z is β-OH] was prepared from 2.60 g. of 17β-hydroxy - 17α - ethynylspiro[4-androstene-2,3'(2'α)-1'-pyrazolin]-3-one (Example C4) and boron trifluoride according to the procedure described above in Example D1. The product was obtained in the form of colorless prisms, M.P. 190.0–192.0° C. (corr.) when recrystallized from an acetone-ethyl acetate mixture and then from ethyl acetate; $[α]_D^{25}$=−67.4° (1% in chloroform); ultraviolet maximum at 242 mμ ($ε$=15,190); infrared absorption at 2.99, 3.09, 3.44, 4.78, 6.11, 6.22 and 6.90μ.

2,2 - ethylene - 17α-ethynyl-4-androsten-17β-ol-3-one showed progestational activity by endometrial response

Example D5

2,2 - ethylene - 19-nor-4-androsten-17β-ol-one [V–A ($\Delta^4$); R and R″ are H, X is $H_2$, Y is H, Y′ is $CH_3$, Z is β-OH] was prepared from 1.61 g. of 17β-hydroxyspiro[19 - nor-4-androstene-2,3′(2′α)-1′-pyrazolin]-3-one (Example C5) and 35 ml. of 80% aqueous acetic acid according to the procedure described above in Example D3. The product was obtained in the form of colorless needles, M.P. 150.0° C. (corr.) when recrystallized from ether; $[\alpha]_D^{25}=-20.6°$ (1% in chloroform); ultraviolet maximum at 241 mμ ($\epsilon$=16,300); infrared absorption at 3.08, 3.26, 3.46, 3.54, 6.05, 6.20, 6.81, 6.94 and 7.02μ.

Example D6

(a) 2,2 - ethylene-4-pregnen-17α-ol-3,20-dione [V–A ($\Delta^4$); R is $COCH_3$, R″ is H, X is $H_2$, Y and Y′ are $CH_3$, Z is α-OH] was prepared from 17α-hydroxyspiro[4-pregnene - 2,3′(2′α)-1′-pyrazoline]-3,20-dione (Example C6) and boron trifluoride according to the procedure described above in Example D1. The product had the M.P. 215.0–220.2° C. (corr.) when recrystallized from acetone; $[\alpha]_D^{25}=+18.9°$ (1% in chloroform); ultraviolet maximum at 242 mμ ($\epsilon$=16,250); infrared absorption at 2.96, 3.44, 5.87, 6.11, 6.15, 6.21, 6.28, 6.89 and 6.99μ.

The 20-ethylene glycol ketal of 2,2-ethylene-4-pregnen-17α-ol-3,20-dione had the M.P. 228–230° C., $[\alpha]_D^{25}=+8.3°$ (1% in chloroform) when recrystallized from acetone.

(b) 17α-acetoxy-2,2-ethylene - 4 - pregnene-3,20-dione [V–A ($\Delta^4$); R is $COCH_3$, R″ is H, X is $H_2$, Y and Y′ are $CH_3$, Z is α-$OCOCH_3$].—A mixture of 7.51 g. of 17α-hydroxyspiro[4-pregnene - 2,3′(2′α) - 1′ - pyrazoline] 3,20-dione (Example C6), 0.25 g. of p-toluenesulfonic acid monohydrate, 150 ml. of glacial acetic acid and 150 ml. of acetic anhydride was heated at 80–100° C. for two hours and then allowed to stand at room temperature overnight. The reaction mixture was diluted with ice water, allowed to stand for one hour and then extracted with methylene dichloride. The methylene dichloride solution was dried over anhydrous sodium sulfate, filtered and concentrated to remove the solvent. The residue was chromatographed on 280 g. of silica gel and the column was eluted with pentane-ether 19:1–4:1. The product was recrystallized from an acetone-ether mixture and from ether to give 17α-acetoxy-2,2-ethylene-4-pregnene-3,20-dione in the form of colorless needles, M.P. 185.0–186.0° C. (corr.); $[\alpha]_D^{25}=+7.0°$ (1% in chloroform); ultraviolet maximum at 240 mμ ($\epsilon$=16,500); infrared absorption at 3.27, 3.44, 5.77, 5.84, 6.02, 6.20, 6.96 and 7.99μ.

17α-acetoxy-2,2-ethylene-4-pregnene-3,20-dione showed high progestational activity by endometrial response when administered to estrogen-primed immature female rabbits intramuscularly at a dose level of 0.125 mg./kg./day or orally at a dose level of 0.5 mg./kg./day.

17α-acetoxy-2,2-ethylene-4-pregnene-3,20-dione caused promotion of growth when administered subcutaneously to mature female rats at a dose level of 25 mg./kg./day.

17α-acetoxy-2,2-ethylene - 4 - pregnene-3,20-dione when administered to estrogen-primed ovariectomized monkeys subcutaneously at 1 mg./monkey/day inhibited menses until withdrawal of medication.

(c) 3,17α-diacetoxy-2,2-ethylene - 3,5 - pregnadien-20-one.—A mixture of 25.2 g. of 2,2-ethylene-4-pregnen-17α-ol-3,20-dione, 0.3 g. of p-toluenesulfonic acid monohydrate and 250 ml. of acetic anhydride was stirred at room temperature for one hour, then heated to 80° C. over a period of twenty minutes and held at this temperature for forty minutes. The reaction mixture was poured into 1200 ml. of water and extracted three times with methylene dichloride. The methylene dichloride solution was washed with water, dried over anhydrous sodium sulfate and concentrated while replacing the methylene dichloride with benzene. The benzene solution was chromatographed on 700 g. of silica gel and the column was eluted with pentane-ether 19:1–4:1. The material brought out by pentane-ether 4:1 was dissolved in methylene dichloride containing a few drops of pyridine and the methylene dichloride replaced by methanol while boiling the solution on a hot plate. The product crystallized out upon cooling, and the recrystallization from methylene dichloride-methanol was repeated, followed by a final recrystallization for acetone. There was thus obtained 3,17α-diacetoxy-2,2-ethylene-3,5-pregnadien-20-one in the form of colorless prisms, M.P. 203.6–208.0° C. (corr.); ultraviolet maximum at 245 mμ ($\epsilon$=21,050); infrared absorption at 3.44, 5.72, 5.79, 5.86, 6.06, 6.65, 6.88 and 6.96μ.

3,17α-diacetoxy-2,2-ethylene - 3,5 - pregnadien - 20-one showed progestational activity by positive endometrial response when administered intramuscularly to estrogen-primed immature female rabbits at a dose level of 20 mg./kg./day.

(d) 17-acetoxy-3-methoxy-2,2-ethylene-3,5-pregnadien-20-one.—17α-acetoxy - 2,2 - ethylene - 4 - pregnene-3,20-dione (part b) (21.7 g.) was suspended in 250 ml. of tetrahydrofuran and treated with 100 ml. of trimethyl orthoformate and 0.5 g. of p-toluenesulfonic acid monohydrate. The reaction mixture was stirred at room temperature for two weeks while periodically adding additional 0.5 g. portions of p-toluenesulfonic acid and sulfosalicylic acid. The reaction mixture was treated with 3 ml. of pyridine, filtered, and the filtrate concentrated to remove the solvent. The residue was dissolved in benzene and chromatographed on a column of 200 g. of activated magnesium silicate. The column was eluted with pentane containing 5–10% ether and the product recrystallized from acetone containing a drop of pyridine to give 17-acetoxy-3-methoxy - 2,2 - ethylene - 3,5 - pregnadien-20-one, pale yellow plates, M.P. 214–217° C., $[\alpha]_D^{25}=-183.4°$ (1% in chloroform).

17-acetoxy-3-methoxy - 2,2 - ethylene - 3,5 - pregnadien-20-one showed high progestational activity by positive andometrial response when administered orally to estrogen-primed immature female rabbits at a dose level of 0.5 mg./kg./day.

(e) 17α-acetoxy-2,2 - ethylene - 4,6 - pregnadiene-3,20-dione.—To a solution of 5.00 g. of 17-acetoxy-3-methoxy-2,2-ethylene-3,5-pregnadien-20-one in 700 ml. of acetone and 50 ml. of water was added 4.00 g. of 2,3-dichloro-5,6-dicyanobenzoquinone. After 10 minutes at room temperature, the reaction mixture was diluted with water and 3 drops of 5% sodium hydroxide. The solid product was collected and recrystallized from acetone, to give 17α-acetoxy-2,2-ethylene-4,6-pregnadiene-3,20-dione, light yellow crystals, M.P. 216–219° C., $[\alpha]_D^{25}=-130.3°$ (1% in chloroform).

17α - acetoxy - 2,2 - ethylene - 4,6 - pregnadiene - 3,20-dione showed high progestational activity by positive andometrial response when administered orally to estrogen-primed immature female rabbits at a dose level of 2.0 mg./kg./day.

17α - acetoxy - 2,2 - ethylene - 4,6 - pregnadiene - 3,20-dione can be hydrolyzed by heating with alcoholic potassium carbonate to give 17α-hydroxy-2,2-ethylene-4,6-pregnadiene-3,20-dione.

(f) 17α-acetoxy-2,2-ethylene - 6β - chloro-4-pregnene-3,20-dione.—To a stirred solution of 12.76 g. of 17-acetoxy-3-methoxy - 2,2 - ethylene-3,5-pregnadien-20-one in 900 ml. of acetone cooled to 0° C. was added 6.24 g. of sodium acetate in 60 ml. of water, followed by 4.78 g. of N-chlorosuccinimide and 5.7 ml. of acetic acid in small portions over a period of 2–4 minutes. The reaction mixture was stirred for 45 minutes and then diluted with 4 liters of water. The product was collected and recrystallized from ether and then repeated from methanol to give 17α - acetoxy - 2,2 - ethylene-6β-chloro-4-pregnene-3,20-dione, light yellow crystals, M.P. 196–199° C. (evacuated tube), [α]$_D^{25}$=—51.8° (1% in chloroform).

17α - acetoxy - 2,2 - ethylene-6β-chloro-4-pregnene-3,20-dione showed high progestational activity by positive endometrial response when administered orally to estrogen-primed immature female rabbits at a dose level of 2.0 mg./kg./day.

17α - acetoxy - 2,2 - ethylene-6β-chloro-4-pregnene-3,20-dione can be hydrolyzed by heating with alcoholic potassium carbonate to give 17α-hydroxy - 2,2 - ethylene-6β-chloro-4-pregnene-3,20-dione.

By replacing the N-chlorosuccinimide in the foregoing preparation by a molar equivalent amount of N-bromosuccinimide, there can be obtained 17-acetoxy-2,2-ethylene-6β-bromo-4-pregnene-3,20-dione.

By treating 17-acetoxy-3-methoxy-2,2-ethylene-3,5-pregnadien-20-one with perchloryl fluoride (FClO$_3$) in pyridine for three minutes at —20° C. there can be obtained 17-acetoxy-2,2-ethylene - 6β-fluoro-4-pregnene-3,20-dione.

(g) 17α - acetoxy - 3 - methoxy-2,2-ethylene-6-chloro-3,5-pregnadien-20-one, pale green rods, M.P. 267–269° C. (from methylene dichloride-acetone), [α]$_D^{25}$=—198.5° (1% in chloroform) was prepared from 5.84 g. of 17α-acetoxy-2,2-ethylene - 6β - chloro - 4 - pregnene-3,20-dione and 15 ml. of trimethyl orthoformate in the presence of p-toluenesulfonic acid, 24 hours at room temperature.

17α - acetoxy - 3 - methoxy - 2,2 - ethylene-6-chloro-3,5-pregnadien-20-one showed high progestational activity by positive endometrial response when administered orally to estrogen-primed immature female rabbits at a dose level of 0.5 mg./kg./day.

(h) 17α - acetoxy - 2,2 - ethylene-6-chloro-4,6-pregnadiene-3,20-dione, M.P. 274–274.5° C. (colorless needles from acetone), was prepared by reacting 6.00 g. of 17α-acetoxy-3-methoxy-2,2-ethylene-6-chloro - 3,5-pregnadien-20-one with 4.26 g. of 2,3-dichloro-5,6-dicyanobenzoquinone in aqueous acetone, by the procedure described above in part (e).

17α - acetoxy - 2,2 - ethylene-6-chloro-4,6-pregnadiene-3,20-dione showed high progestational activity by positive endometrial response when administered orally to estrogen-primed immature female rabbits at a dose level of 0.125 mg./kg./day.

17α - acetoxy - 2,2 - ethylene-6-chloro-4,6-pregnadiene-3,20-dione can be hydrolyzed by heating with alcoholic potassium carbonate to give 17α-hydroxy-2,2-ethylene-6-chloro-4,6-pregnadiene-3,20-dione.

(i) 17α - acetoxy - 2,2 - ethylene-6α-chloro-4-pregnene-3,20-dione, M.P. 184–189° C. (light cream-colored plates from ethyl acetate) was prepared by treating 8.00 g. of 17α - acetoxy - 3 - methoxy-2,2-ethylene-6-chloro-3,5-pregnadien-20-one with 4.0 ml. of 20% aqueous hydrochloric acid in 500 ml. of acetic acid, 45 minutes at room temperature.

17α - acetoxy - 2,2 - ethylene-6α-chloro-4-pregnene-3,20-dione showed high progestational activity by positive endometrial response when administered orally to estrogen-primed immature female rabbits at a dose level of 0.125 mg./kg./day.

17α - acetoxy - 2,2 - ethylene-6α-chloro-4-pregnene-3,20-dione can be hydrolyzed by heating with alcoholic potassium carbonate to give 17α-hydroxy - 2,2 - ethylene-6α-chloro-4-pregnene-3,20-dione.

Example D7

2,2 - ethylene - 17α - ethynyl-19-nor-4-androsten-17β-ol-3-one [V–A (Δ$^4$); R is α-C≡CH, R″ is H, X is H$_2$, Y is H, Y′ is CH$_3$, Z is β-OH] was prepared from 2.26 g. of 17β - hydroxy - 17α - ethynylspiro[19-nor-4-androstene-2,3′(2′α)-1′-pyrazolin] - 3 - one (Example C7) and boron trifluoride according to the procedure described above in Example D1. The product was obtained in the form of colorless needles, M.P. 218.0–219.0° C. (corr.);

[α]$_D^{25}$=—109.5°

(1% in chloroform); ultraviolet maximum at 241.5 mμ (ε=15,900); infrared absorption at 3.00, 3.04, 3.27, 3.42, 3.51, 3.56, 6.04, 6.20 and 6.91μ.

2,2 - ethylene - 17α - ethynyl-19-nor-4-androsten-17β-ol-3-one showed progestational activity by positive endometrial response when administered intramuscularly to estrogen-primed immature female rabbits at a dose level of 10 mg./kg./day.

Example D7A

21 - acetoxy - 2,2 - ethylene-4-pregnen-17α-ol-3,11,20-trione.—A suspension of 10.3 g. of 17,20:20,21-bis(methylenedioxy)spiro[4 - pregnene - 2,3′(2′α)-1′-pyrazoline]-3,11-dione (Example C7A) in 300 ml. of 60% aqueous formic acid was stirred and heated on a steam bath under nitrogen for 105 minutes. The reaction mixture was diluted with ten volumes of water, and the total product obtained by filtration and by extraction of the filtrate with methylene dichloride was treated with 10 ml. of acetic anhydride in 50 ml. of pyridine, sixteen hours at room temperature. The mixture was diluted with water, the product collected and dissolved in benzene-methylene dichloride. The solution was concentrated and the residual syrup chromatographed on 300 g. of silica gel. The column was eluted with pentane containing increasing proportions of ether; pentane-ether (1:1) brought out the desired product which was recrystallized from methanol to give 21-acetoxy - 2,2-ethylene-4-pregnen-17α-ol-3,11,20-trione, colorless needles, M.P. 209–212° C., [α]$_D^{25}$=+138.5° (1% in chloroform).

21 - acetoxy - 2,2 - ethylene-4-pregnen-17α-ol-3,11,20-trione can be hydrolyzed by heating with alcoholic potassium carbonate to give 21-hydroxy-2,2-ethylene-4-pregnen-17α-ol-3,11,20-trione.

Example D7B 2,2 - ethylene - 6α - methyl-4-pregnen-17α-ol-3,20-dione was prepared by reacting 6α-methyl - 17α - hydroxyspiro [4 - pregnene-2,3′(2′α)-1′-pyrazoline] - 3,20 - dione 20-monoethylene glycol ketal (Example C7B) with boron trifluoride etherate in acetone according to the procedure described above in Example D1. The product was dissolved in benzene and chromatographed on activated magnesium silicate. The column was eluted with benzene and benzene containing increasing proportions of ether (1–5%). The eluted material was recrystallized from acetonitrile to give 2,2-ethylene-6α-methyl-4-pregnen - 17α - ol-3,20-dione, M.P. 175–178° C.

To 2,2-ethylene-6α-methyl - 4 - pregnen-17α-ol-3,20-dione (2.67 g.) in 50 ml. of ethyl acetate was added dropwise 30 ml. of acetic anhydride containing two drops of 72% perchloric acid over a period of eight minutes. The reaction mixture was allowed to stand at room temperature for 20 minutes, 5–6 drops of pyridine added, and the mixture poured into water. The product was isolated, purified by chromatography on activated magnesium silicate, and recrystallized from acetonitrile to give 3,17α-diacetoxy-2,2-ethylene-6-methyl-3,5-pregnadien - 20 - one, M.P. 191.5–195° C.; [α]$_D^{25}$=—209.6° (1% in chloroform).

3,17α-diacetoxy-2,2-ethylene-6-methyl-3,5 - pregnadien-20-one showed high progestational activity by positive endometrial response when administered orally to estrogen-primed immature female rabbits at a dose level of 0.5 mg./kg./day.

According to the foregoing procedures the following compounds can be prepared:

| Ex. | Starting material | Final product |
|---|---|---|
| D8 | 4',17β-dihydroxy-17α-ethyl-spiro[4-androstene-2,3'(2'α)-1'-pyrazolin]-3-one. | 2,2-ethylene-17α-ethyl-4-androsten-17β-ol-3-one. |
| D9 | 4',17β-dihydroxy-17α-vinyl-spiro[4-androstene-2,3'(2'α)-1'-pyrazolin]-3-one. | 2,2-ethylene-17α-vinyl-4-androsten-17β-ol-3-one. |
| D10 | 4',17β-dihydroxy-17α-methyl-spiro[5α-androstane-2,3'(2'α)-1'-pyrazolin]-3-one. | 2,2-ethylene-17α-methyl-5α-androstan-17β-ol-3-one. |
| D11 | 4',17β-dihydroxy-17α-methyl-spiro[5β-androstane-2,3'(2'α)-1'-pyrazolin]-3-one. | 2,2-ethylene-17α-methyl-5β-androstan-17β-ol-3-one. |
| D12 | 4',17β-dihydroxy-17α-methyl-spiro[19-nor-5α-androstane-2,3'(2'α)-1'-pyrazolin]-3-one. | 2,2-ethylene-17α-methyl-19-norandrostan-17β-ol-3-one. |
| D13 | 4',17β-dihydroxy-17α-ethyl-spiro[5α-androstane-2,3'(2'α)-1'-pyrazolin]-3-one. | 17α-ethyl-2,2-ethylene-5α-androstan-17β-ol-3-one. |
| D14 | 4'-hydroxyspiro[allo-pregnane-2,3'(2'α)-1'-pyrazoline]-3,20-dione 20-ethylene glycol ketal. | 2,2-ethyleneallopregnane-3,20-dione 20-ethylene glycol ketal. |
| D15 | 4'-hydroxyspiro[pregnane-2,3'(2'α)-1'-pyrazoline]-3,20-dione. | 2,2-ethylenepregnane-3,20-dione. |
| D16 | 4',17β-dihydroxyspiro[5α-androstane-2,3'(2'α)-1'-pyrazolin]-3-one. | 2,2-ethylene-5α-androstan-17β-ol-3-one. |
| D17 | 4'-hydroxyspiro[4,6-androstadiene-2,3'(2'α)-1'-pyrazolin]-3-one. | 2,2-ethylene-4,6-androstadien-17β-ol-3-one. |
| D18 | 4',20β-dihydroxyspiro[4-pregnene-2,3'(2'α)-1'-pyrazolin]-3-one. | 2,2-ethylene-4-pregnen-20β-ol-3-one. |
| D19 | 4',17β-dihydroxy-4,4,17α-trimethylspiro[5-androstene-2,3'(2'α)-1'-pyrazolin]-3-one. | 2,2-ethylene-4,4,17α-trimethyl-5-androsten-17β-ol-3-one. |
| D20 | 4',17β-dihydroxy-4,4-dimethylspiro[5-androstene-2,3'(2'α)-1'-pyrazolin]-3-one. | 2,2-ethylene-4,4-dimethyl-5-androsten-17β-ol-3-one. |
| D21 | 4',17α,21-trihydroxyspiro[4-pregnene-2,3'(2'α)-1'-pyrazoline]-3,11,20-trione. | 2,2-ethylene-4-pregnene-17α,21-diol-3,11,20-trione. |
| D22 | 4',17β-dihydroxy-17α-ethynyl-spiro[5α-androstane-2,3'(2'α)-1'-pyrazolin]-3-one. | 2,2-ethylene-17α-ethynyl-5α-androstan-17β-ol-3-one. |
| D23 | 4',17β-dihydroxy-17α-propargylspiro[5α-androstane-2,3'(2'α)-1'-pyrazolin]-3-one. | 2,2-ethylene-17α-propargyl-5α-androstan-17β-ol-3-one. |
| D24 | 4',20,21-trihydroxyspiro[4-pregnene-2,3'-(2'α)-1'-pyrazolin]-3-one. | 2,2-ethylene-4-pregnene-20,21-diol-3-one. |
| D25 | 4',11β,17α,21-tetrahydroxy-9α-fluorospiro[4-pregnene-2,3'(2'α)-1'-pyrazoline]-3,20-dione 20-monoethylene glycol ketal. | 2,2-ethylene-9-fluoro-4-pregnene-11β,17α,21-triol-3,20-dione 20-monoethylene glycol ketal. |
| D26 | 4',16α,17α,21-tetrahydroxy-9β,11β-epoxyspiro[4-pregnene-2,3'(2'α)-1'-pyrazoline]-3,20-dione 20-monoethylene glycol ketal. | 2,2-ethylene-4-pregnene-16α,17α,21-triol-3,20-dione-9β,11β-oxide 20-monoethylene glycol ketal. |
| D27 | 4',17β-dihydroxy-17α-(1-propynyl)-6α-methylspiro[4-androstene-2,3'(2'α)-1'-pyrazolin]-3-one. | 2,2-ethylene-17α-propynyl-6α,methyl-4-androsten-17β-ol-3-one. |
| D28 | 4',11β,17α,21-tetrahydroxy-21-acetoxyspiro[4-pregnene-2,3'(2'α)-1'-pyrazoline]-3,20-dione 20-monoethylene glycol ketal. | 2,2-ethylene-21-acetoxy-4-pregnene-11β,17α-diol-3,20-dione 20-monoethylene glycol ketal. |
| D29 | 4',17α-dihydroxy-21-acetoxyspiro[4-pregnene-2,3'(2'α)-1'-pyrazoline]-3,20-dione 20-monoethylene glycol ketal. | 2,2-ethylene-21-acetoxy-4-pregnen-17α-ol-3,20-dione 20-monoethylene glycol ketal. |
| D30 | 4',11β,16α,17α-tetrahydroxy-21-acetoxyspiro[4-pregnene-2,3'-(2'α)-1'-pyrazoline]-3,20-dione 20-monoethylene glycol ketal. | 2,2-ethylene-21-acetoxy-4-pregnene-11β,16α,17α-triol-3,20-dione 20-monoethylene glycol ketal. |
| D31 | 4',11β,21-trihydroxyspiro[4,17(20)-pregnadiene-2,3'-(2'α)-1'-pyrazolin]-3-one. | 2,2-ethylene-4,17(20)-pregnadiene-11β,21-diol-3-one. |
| D32 | 4',6β,17β-trihydroxyspiro[5α-androstane-2,3'-(2'α)-1'-pyrazolin]-3-one. | 2,2-ethylene-5α-androstane-6β,17β-diol-3-one. |
| D33 | 4',17β-dihydroxy-17α-ethynylspiro[4-androstene-2,3'(2'α)-1'-pyrazolin]-3,11-dione. | 2,2-ethylene-17α-ethynyl-4-androsten-17β-ol-3,11-dione. |
| D34 | 4',17β-dihydroxy-17α-methyl-spiro[4-androstene-2,3'-(2'α)-1'-pyrazoline]-3,11-dione. | 2,2-ethylene-17α-methyl-4-androsten-17β-ol-3,11-dione. |
| D35 | 4',17β-dihydroxyspiro[4-androstene-2,3'(2'α)-1'-pyrazoline]-3,11-dione. | 2,2-ethylene-4-androsten-17β-ol-3,11-dione. |
| D36 | 4',6β,17β-trihydroxy-17α-methylspiro[4-androstene-2,3'(2'α)-1'-pyrazolin]-3-one. | 2,2-ethylene-17α-methyl-4-androstene-6β,17β-diol-3-one. |
| D37 | 4',14α,17β-trihydroxyspiro[4-androstene-2,3'(2'α)-1'-pyrazolin]-3-one. | 2,2-ethylene-4-androstene-14α,17β-diol-3-one. |
| D38 | 4',17β-dihydroxy-16β-methyl-spiro[4-androstene-2,3'(2'α)-1'-pyrazolin]-3-one. | 2,2-ethylene-16β-methyl-4-androsten-17β-ol-3-one. |
| D39 | 4',11α,17β-trihydroxyspiro[4-androstene-2,3'(2'α)-1'-pyrazolin]-3-one. | 2,2-ethylene-4-androstene-11α,17β-diol-3-one. |
| D40 | 4',17β-dihydroxy-4-bromo-17α-methylspiro[4-androstene-2,3'(2'α)-1'-pyrazolin]-3-one. | 2,2-ethylene-4-bromo-17α-methyl-4-androsten-17β-ol-3-one. |
| D41 | 4',17β-dihydroxy-4-methyl-spiro[4-androstene-2,3'(2'α)-1'-pyrazolin]-3-one. | 2,2-ethylene-4-methyl-4-androsten-17β-ol-3-one. |
| D42 | 4',12α,17α-trihydroxy-21-acetoxyspiro[4-pregnene-2,3'(2'α)-1'-pyrazolin]-3,20-dione 20-monoethylene glycol ketal. | 2,2-ethylene-21-acetoxy-4-pregnene-12α,17α-diol-3,20-dione 20-monoethylene glycol ketal. |
| D43 | 4'-hydroxyspiro[4,11-pregnadiene-2,3'(2'α)-1'-pyrazoline]-3,20-dione 20-monoethylene glycol ketal. | 2,2-ethylene-4,11-pregnadiene-3,20-dione 20-monoethylene glycol ketal. |
| D44 | 4'-hydroxy-17α-methylspiro[4-pregnene-2,3'(2'α)-1'-pyrazoline]-3,20-dione 20-monoethylene glycol ketal. | 2,2-ethylene-17α-methyl-4-pregnene-3,20-dione 20-monoethylene glycol ketal. |
| D45 | 4',7β,11β-trihydroxy-spiro-[4-pregnene-2,3'-(2'α)-1'-pyrazoline]-3,20-dione 20-monoethylene glycol ketal. | 2,2-ethylene-4-pregnene-7β,11β-diol-3,20-dione 20-monoethylene glycol ketal. |
| D46 | 4',17α,21-trihydroxy-12α-chlorospiro[4-pregnene-2,3'(2'α)-1'-pyrazoline]-3,11,20-trione 20-monoethylene glycol ketal. | 2,2-ethylene-12α-chloro-4-pregnene-17α,21-diol-3,11,20-trione 20-monoethylene glycol ketal. |
| D47 | 4'-hydroxyspiro[18,19-bisnor-4-pregnene-2,3'(2'α)-1'-pyrazoline]-3,20-dione 20-monoethylene glycol ketal. | 2,2-ethylene-18,19-bisnor-4-pregnene-3,20-dione 20-monoethylene glycol ketal. |
| D48 | 4'-hydroxyspiro[allo-pregnane-2,3'(2'α)-1'-pyrazoline]-3,7,20-trione 7,20-bis-(ethylene glycol ketal). | 2,2-ethyleneallopregnane-3,7,20-trione 7, 20-bis-(ethylene glycol ketal). |
| D49 | 4',11β,17α,21-tetrahydroxy-9α-fluorospiro[4-pregnene-2,3'(2'α)-1'-pyrazoline]-3,20-dione 17,20;20,21-bismethylenedioxy derivative. | 2,2-ethylene-9α-fluoro-4-pregnene-11β,17α,21-triol-3,20-dione 17,20;20,21-bis-methylenedioxy derivative. |
| D50 | 4'-hydroxy-4,4-dimethyl-spiro[5-pregnene-2,3'-(2'α)-1'-pyrazoline]-3,20-dione 20-monoethylene glycol ketal. | 2,2-ethylene-4,4-dimethyl-5-pregnene-3,20-dione 20-monoethylene glycol ketal. |
| D51 | 4'-hydroxy-6α,7α-epoxyspiro-[4-pregnene-2,3'-(2'α)-1'-pyrazoline]-3,20-dione 20-monoethylene glycol ketal. | 2,2-ethylene-6α,7α-epoxy-4-pregnene-3,20-dione 20-monoethylene glycol ketal. |
| D52 | 4'-hydroxy-6α-chlorospiro-[4-pregnene-2,3'(2'α)-1'-pyrazoline]-3,20-dione 20-monoethylene glycol ketal. | 2,2-ethylene-6α-chloro-4-pregnene-3,20-dione 20-monoethylene glycol ketal. |

I claim:

1. A 4' - hydroxyspiro[steroid - 2,5' - m - dioxan] - 3-one or 4' - acyloxyspiro[steroid - 2,5' - m - dioxan] - 3-one wherein the steroid moiety has from seventeen to twenty-three carbon atoms exclusive of ester radicals and is a member of the estrane, 18-norestrane, androstane, etiocholane, pregnane or allopregnane series; and the acyl group is a carboxylic acyl group having from one to twelve carbon atoms.

2. (A) A compound according to claim 1 of the formula wherein R is hydrogen, lower-alkyl, lower-alkenyl, lower-alkynyl, acetyl, hydroxyacetyl, 1,2-dihydroxyethyl or 1-hydroxyethyl; R' is hydrogen or methyl; X is H₂, (H) (OH) or O; Y and Y' are hydrogen or methyl; and Z is hydrogen or hydroxy, Z being restricted to hydroxy when R is hydrogen, lower-alkyl, lower-alkenyl or lower-alkynyl; (B) a compound under (A) having a double bond in the 4,5-position; (C) a compound under (A) having two double bonds in the 4,5- and 6,7-positions; or a carboxylic acid ester or 3-enol ester of a compound under (A), (B) or (C) in which the acyl group has from one to twelve carbon atoms.

3. A compound according to claim 2 wherein R is hydrogen, lower-alkyl or lower-alkynyl; R' is hydrogen; X is $H_2$; Y is hydrogen or methyl; Y' is methyl; Z is β-hydroxy; and there is a double bond in the 4,5-position; or a carboxylic acid ester thereof in which the acyl group has been from one to twelve carbon atoms.

4. 4',17β - dihydroxyspiro[4 - androstene - 2,5' - m-dioxan]-3-one, according to claim 3, wherein R is hydrogen and Y is methyl.

5. 4',17β - dihydroxy - 17α - methylspiro[4 - androstene-2,5'-m-dioxan]-3-one, according to claim 3, wherein R and Y are methyl.

6. 4' - acetoxy - 17β - hydroxy - 17α - methylspiro-[4 - androstene - 2,5' - m - dioxan] - 3 - one, according to claim 3, wherein R and Y are methyl and the 4'-hydroxy group is acetylated.

7. 4' - hydroxyspiro[4 - pregnene - 2,5' - m - dioxane]-3,20-dione, according to claim 2, wherein R is acetyl, R' is hydrogen, X is $H_2$, Y and Y' are methyl, Z is hydrogen; and there is a double bond in the 4,5-position.

8. The process for preparing a 4'-hydroxyspiro[steroid-2,5'-m-dioxan]-3-one according to claim 1 which comprises treating with formaldehyde a 2-hydroxymethylene - 3 - oxo-steroid, wherein the steroid moiety has from seventeen to twenty-three carbon atoms exclusive of ester radicals and is a member of the estrane, 18-norestrane, androstane, etiocholane, pregnane or allopregnane series.

9. A compound of the formula

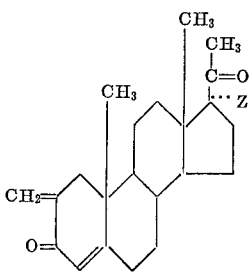

wherein Z is hydrogen or hydroxy.

10. 2-methylene-4-pregnene-3,20-dione, according to claim 9, wherein Z is hydrogen.

11. 2 - methylene - 4 - pregnen - 17α - ol - 3,20 - dione, according to claim 9, wherein Z is hydroxy.

12. The process for preparing a 2-methylene-3-oxo-steroid which comprises treating under mild alkaline conditions a 4' - hydroxyspiro[steroid - 2,5' - m - dioxan]-3-one, wherein the steroid moiety has from seventeen to twenty-three carbon atoms exclusive of ester radicals and is a member of the estrane, 18-norestrane, androstane, etiocholane, pregnane or allopregnane series.

13. A process according to claim 12 wherein the mild alkaline conditions are provided by an alkali metal carbonate.

14. A process according to claim 12 wherein the mild alkaline conditions are provided by aluminum oxide.

15. A spiro[steroid - 2,3'(2'α) - 1' - pyrazolin] - 3-one or spiro[steroid - 2,3'(2'α) - 5' - pyrazolin] - 3 - one wherein the steroid moiety has from seventeen to twenty-three carbon atoms exclusive of ester radicals and is a member of the estrane, 18-norestrane, androstane, etiocholane, pregnane or allopregnane series.

16. (A) A compound according to claim 15 of the formula

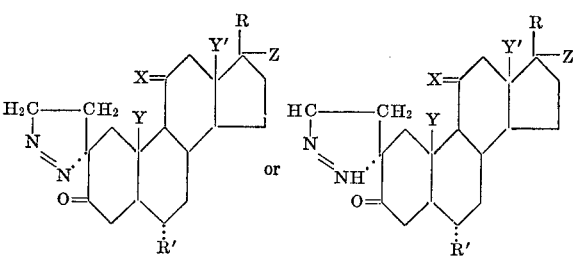

wherein R is hydrogen, lower-alkyl, lower-alkenyl, lower-alkynyl, acetyl, hydroxyacetyl, 1,2-dihydroxyethyl or 1-hydroxyethyl; R' is hydrogen or methyl; X is $H_2$, (H)(OH) or O; Y and Y' are hydrogen or methyl; and Z is hydrogen or hydroxy, Z being restricted to hydroxy when R is hydrogen, lower-alkyl, lower-alkenyl or lower-alkynyl; (B) a compound under (A) having a double bond in the 4,5-position; (C) a compound under (A) having two double bonds in the 4,5- and 6,7-positions; or a carboxylic acid ester or 3-enol ester of a compound under (A), (B) or (C) in which the acyl group has from one to twelve carbon atoms.

17. A compound according to claim 16 wherein R is hydrogen, lower-alkyl or lower-alkynyl; R' is hydrogen; X is $H_2$; Y is hydrogen or methyl; Y' is methyl; Z is β-hydroxy; and there is a double bond in the 4,5-position; or a carboxylic acid ester thereof in which the acyl group has from one to twelve carbon atoms.

18. 17β - hydroxy - 17α - ethynylspiro[4 - androstene-2,3'(2'α)-1'-pyrazolin]-3-one, according to claim 17, wherein R is ethynyl and Y is methyl.

19. Spiro[4 - pregnene - 2,3'(2'α) - 1' - pyrazoline]-3,20-dione, according to claim 16, wherein R is acetyl, R' is hydrogen, X is $H_2$, Y and Y' are methyl, Z is hydrogen; and there is a double bond in the 4,5-position.

20. 17α - hydroxyspiro[4 - pregnene - 2,3'(2'α) - 1'-pyrazoline]-3,20-dione, according to claim 16, wherein R is acetyl, R' is hydrogen, X is $H_2$, Y and Y' are methyl, Z is hydroxy; and there is a double bond in the 4,5-position.

21. 17β - hydroxy - 17α - methylspiro[4 - androstene-2,3'(2'α)-1'-pyrazolin]-3-one, according to claim 17, wherein R and Y are methyl.

22. The process for preparing a spiro[steroid-2,3'(2'α)-1'-pyrazolin]-3-one according to claim 15 which comprises treating with diazomethane a 2-methylene-3-oxo-steroid, wherein the steroid moiety has from seventeen to twenty-three carbon atoms exclusive of ester radicals and is a member of the estrane, 18-norestrane, androstane, etiocholane, pregnane or allopregnane series.

23. A compound of the formula

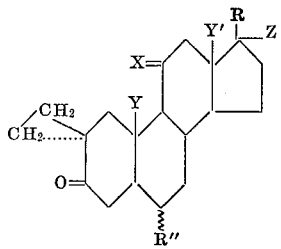

wherein R is lower-alkenyl, lower-alkynyl, acetyl, hydroxyacetyl, 1,2-dihydroxyethyl or 1-hydroxyethyl; R'' is hydrogen or α-methyl; X is $H_2$, (H)(OH) or O; Y and Y' are hydrogen or methyl; and Z is hydrogen or hydroxy, Z being restricted to hydroxy when R is lower-alkenyl or lower-alkynyl; (B) a compound under (A), wherein R, X, Y, Y' and Z have the meanings given above and R'' is hydrogen, α-methyl or halo, having a double bond in the 4,5-position; or (C) a compound under (A), wherein R, X, Y, Y' and Z have the meanings given above and R'' is hydrogen, α-methyl or halo, having two double bonds in the 4,5- and 6,7-positions; or a carboxylic acid ester or 3-enol ester of a compound under (A), (B) or (C) in which the acyl group has from one to twelve carbon atoms.

24. 2,2 - ethylene - 17α - ethynyl - 4 - androsten - 17β-ol-3-one, according to claim 23, wherein R is ethynyl, R' is H, X is $H_2$, Y and Y' are methyl, Z is hydroxy; and there is a double bond in the 4,5-position.

25. 2,2 - ethylene - 4 - pregnene - 3,20 - dione, according to claim 23, wherein R is acetyl, R' is H, X is $H_2$, Y and Y' are methyl, Z is hydrogen; and there is a double bond in the 4,5-position.

26. 2,2 - ethylene - 17α - ethynyl - 19 - nor - 4 - androsten-17β-ol-3-one, according to claim 23, wherein R is ethynyl, R' is H, X is $H_2$, Y is H, Y' is methyl, Z is hydroxy; and there is a double bond in the 4,5-position.

27. 17α-acetoxy-2,2-ethylene-4-pregnene-3,20-dione, according to claim 23, wherein R is acetyl, R' is H, X is $H_2$, Y and Y' are methyl, Z is acetoxy; and there is a double bond in the 4,5-position.

28. 2,2 - ethylene - 4 - pregnen - 17α - ol - 3,20 - dione, according to claim 23, wherein R is acetyl, R' is H, X is $H_2$, Y and Y' are methyl, Z is hydroxy; and there is a double bond in the 4,5-position.

29. 2,2 - ethylene - 19 - nor - 4 - androsten - 17β - ol-3-one, according to claim 23, wherein R is hydrogen, R' is H, X is $H_2$, Y is H, Y' is methyl, Z is hydroxy; and there is a double bond in the 4,5-position.

30. 2,2 - ethylene - 17α - methyl - 4 - androsten - 17β-ol-3-one, according to claim 23, wherein R is methyl, R' is H, X is $H_2$, Y and Y' are methyl, Z is hydroxy; and there is a double bond in the 4,5-position.

31. 3,17α - diacetoxy - 2,2 - ethylene - 3,5 - pregnadien-20-one, according to claim 23, being the 3-enol acetate of the compound where R is acetyl, R' is H, X is $H_2$, Y and Y' are methyl, Z is acetoxy; and there is a double bond in the 4,5-position.

32. 17α - hydroxy - 2,2 - ethylene - 4,6 - pregnadiene-3,20-dione or the acetate thereof, according to claim 23, wherein R is acetyl, R' is H, X is $H_2$, Y and Y' are methyl, Z is hydroxy or acetoxy; and there are two double bonds in the 4,5- and 6,7-positions.

33. 17α - hydroxy - 2,2 - ethylene - 6β - chloro - 4 - pregnene-3,20-dione or the 17-acetate thereof, according to claim 23, wherein R is acetyl, R' is β-chloro, X is $H_2$, Y and Y' are methyl, Z is hydroxy or acetoxy; and there is a double bond in the 4,5-position.

34. 17α - hydroxy - 2,2 - ethylene - 6 - chloro - 4,6-pregnadiene-3,20-dione or the 17-acetate thereof, according to claim 23, wherein R is acetyl, R' is chloro, X is $H_2$, Y and Y' are methyl, Z is hydroxy or acetoxy; and there are two double bonds in the 4,5- and 6,7-positons.

35. 17α - hydroxy - 2,2 - ethylene - 6α - chloro - 4 - pregnene-3,20-dione or the 17-acetate thereof, according to claim 23, wherein R is acetyl, R' is α-chloro, X is $H_2$, Y and Y' are methyl, Z is hydroxy or acetoxy; and there is a double bond in the 4,5-position.

36. 21 - hydroxy - 2,2 - ethylene - 4 - pregnen - 17α-ol-3,11,20-trione or the 21-acetate thereof, according to claim 23, wherein R is hydroxyacetyl or acetoxyacetyl, R' is H, X is O, Y and Y' are methyl, Z is hydroxy; and there is a double bond in the 4,5-position.

37. 2,2 - ethylene - 6α - methyl - 4 - pregnen - 17α - ol-3,20-dione, according to claim 23, wherein R is acetyl, R' is α-methyl, X is $H_2$, Y and Y' are methyl, Z is hydroxy; and there is a double bond in the 4,5-position.

38. A process for preparing a 2,2-ethylene-3-oxosteroid which comprises either heating alone or treating with an acid a spiro[steroid-2,3'(2'α)-1'-pyrazolin]-3-one or spiro [steroid-2,3'(2'α)-5'-pyrazolin]-3-one, wherein the steroid moiety has from seventeen to twenty-three carbon atoms exclusive of ester radicals and is a member of the estrane, 18-norestrane, androstane, etiocholane, pregnane or allopregnane series.

39. The process according to claim 38 in which the spiro[steroid - 2,3'(2'α) - 1'-pyrazolin] - 3 - one or spiro [steroid-2,3'(2'α)-5'-pyrazolin]-3-one is prepared by treating a 2-hydroxymethylene-3-oxo-steroid with formaldehyde, treating under mild alkaline conditions the resulting 4'-hydroxyspiro[steroid-2,5'-m-dioxan]-3-one, and treating the resulting 2-methylene-3-oxo-steroid with diazomethane.

No references cited.

ELBERT L. ROBERTS, Primary Examiner

U.S. Cl. X.R.

260—239.55, 397.3, 397.4, 397.45

PO-1050
(5/69)

UNITED STATES PATENT OFFICE
CERTIFICATE OF CORRECTION

Patent No. 3,510,477   Dated May 5, 1970

Inventor(s) Andrew John Manson

It is certified that error appears in the above-identified patent and that said Letters Patent are hereby corrected as shown below:

Column 4, line 22, "($2_2\alpha$)-1'-pyrazolin]-3-one" should read --(2'$\alpha$)-1'-pyrazolin]-3-ones--.

Column 7, line 33, "m-" should read --m-dioxan]- --.

Column 9, Example A17 (Starting), "17$" should read --17$\beta$--; Example A19 (Starting), "2-hydroxyethylene" should read --2-hydroxymethylene--; Example A30 (Final), "4',11$\beta$,16a-" should read --4',11$\beta$,16$\alpha$,17$\alpha$- --.

Column 10, Example A48 (Starting), "pregnene" should read --pregnane--; Example A48 (Final), "allo-pregene-" should read --allopregnane- --.

Column 13, Example B34 (Final), "methyl-" should read --methyl-4- --.

Column 14, Example B42 (Starting), "4',12a,17$\beta$-" should read --4',12$\alpha$,17$\alpha$- --; Example B42 (Final), "12a,17$\beta$" should read --12$\alpha$,17$\alpha$--; line 58, "2,20" should read --3,20--.

Column 15, line 45, "-289.5°" should read -- -389.5°--.

Column 17, Example C28 (Starting), "pregne" should read --pregnene--; Example C28 (Starting), delete fourth line (dione 20-monoethylene); Example C29 (Final), "3,3' " should read --2,3'--; Example C33 (Final), delete first line and insert: --4',17$\beta$-dihydroxy-17$\alpha$-ethynylspiro[4-andro- --; Example C44 (Final), insert --spiro[4-pregnene- -- between first and second lines.

Column 20, lines 45 and 62, "andrometrial" should read --endometrial--.

Column 25, line 13, Claim 3, "has been from" should read --has from--.

[contd.]

UNITED STATES PATENT OFFICE
CERTIFICATE OF CORRECTION

Patent No. 3,510,477     Dated May 5, 1970

Inventor(s) Andrew John Manson     PAGE - 2

It is certified that error appears in the above-identified patent and that said Letters Patent are hereby corrected as shown below:

Column 26, lines 6-10, Claim 16, in right-hand formula:

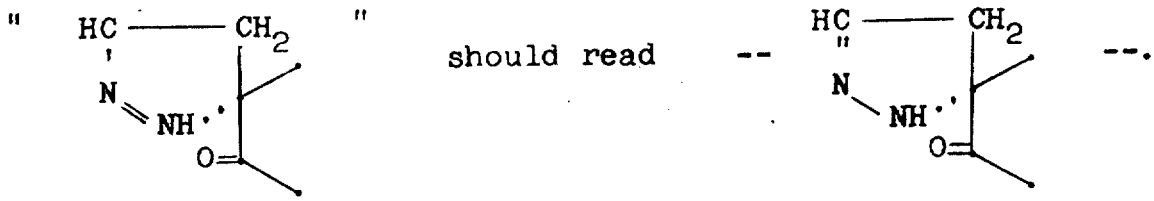

Signed and sealed this 3rd day of August 1971.

(SEAL)
Attest:

EDWARD M. FLETCHER, JR.
Attesting Officer

WILLIAM E. SCHUYLER, JR.
Commissioner of Patents